(12) United States Patent  
Childers et al.

(10) Patent No.: US 11,098,162 B2  
(45) Date of Patent: *Aug. 24, 2021

(54) POLYARYLETHER KETONE IMIDE ADHESIVES

(71) Applicant: THE BOEING COMPANY, Chicago, IL (US)

(72) Inventors: Christopher H. Childers, St. Charles, MO (US); Gregg R. Bogucki, Saint Louis, MO (US); Christopher S. Steinman, Saint Louis, MO (US); Stephen R. Heinz, O'Fallon, MO (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/673,584

(22) Filed: Nov. 4, 2019

(65) Prior Publication Data

US 2020/0062905 A1    Feb. 27, 2020

Related U.S. Application Data

(63) Continuation of application No. 16/023,171, filed on Jun. 29, 2018, now Pat. No. 10,465,046, which is a (Continued)

(51) Int. Cl.
*C08G 73/10* (2006.01)
*C08K 7/06* (2006.01)
(Continued)

(52) U.S. Cl.
CPC ........ *C08G 73/1071* (2013.01); *B29C 65/483* (2013.01); *B29C 66/71* (2013.01);
(Continued)

(58) Field of Classification Search
CPC .. C08G 61/127; C08G 65/4031; C08G 65/48; C08G 65/40; C08G 75/23; C08G 73/06; C08G 73/10
See application file for complete search history.

(56) References Cited

U.S. PATENT DOCUMENTS 4,816,556 A    3/1989  Gay et al.
4,868,271 A    9/1989  Dahl et al.
(Continued)

FOREIGN PATENT DOCUMENTS

EP    0210851 A2    2/1987
WO    8910049 A2    11/1989
(Continued)

OTHER PUBLICATIONS

C. J. Borrill and R. H. Whiteley, Aromatic Ether—Ketone—'X' Polymers, J. Mater. Chem., 1991, 1(4), pp. 655-661.
(Continued)

*Primary Examiner* — Shane Fang
(74) *Attorney, Agent, or Firm* — Patterson + Sheridan, LLP

(57) ABSTRACT

Aspects of the present disclosure generally describe polyarylether ketones and methods of use. In some aspects, a composition includes one or more polymers of formula (IV):

(Continued)

(1)

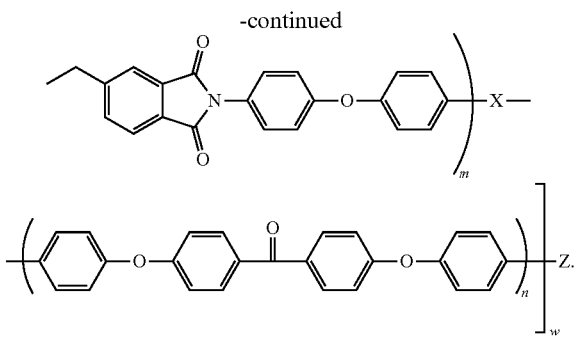

25 Claims, 7 Drawing Sheets

Related U.S. Application Data continuation of application No. 15/068,249, filed on Mar. 11, 2016, now Pat. No. 10,011,685.

(51) Int. Cl.

| | | |
|---|---|---|
| C08K 7/14 | (2006.01) | |
| C08L 79/08 | (2006.01) | |
| C09J 179/08 | (2006.01) | |
| C09D 179/08 | (2006.01) | |
| B29C 65/48 | (2006.01) | |
| B29C 65/00 | (2006.01) | |
| C08G 61/12 | (2006.01) | |
| C09J 165/00 | (2006.01) | |
| C08K 7/02 | (2006.01) | |
| C08K 7/04 | (2006.01) | |
| C08J 7/04 | (2020.01) | |
| C08J 5/24 | (2006.01) | |
| B29K 79/00 | (2006.01) | |
| B29K 105/06 | (2006.01) | |
| B29K 307/04 | (2006.01) | |
| B29K 309/08 | (2006.01) | |
| B29L 31/30 | (2006.01) | |
| B33Y 70/00 | (2020.01) | |
| B29C 65/50 | (2006.01) | |
| B29K 105/16 | (2006.01) | |
| B29C 65/02 | (2006.01) | |
| B33Y 10/00 | (2015.01) | |
| B29K 63/00 | (2006.01) | |

(52) U.S. Cl.
CPC .......... *B29C 66/742* (2013.01); *C08G 61/127* (2013.01); *C08G 73/105* (2013.01); *C08J 5/24* (2013.01); *C08J 7/0427* (2020.01); *C08K 7/02* (2013.01); *C08K 7/04* (2013.01); *C08K 7/06* (2013.01); *C08K 7/14* (2013.01); *C08L 79/08* (2013.01); *C09D 179/08* (2013.01); *C09J 165/00* (2013.01); *C09J 179/08* (2013.01); *B29C 65/02* (2013.01); *B29C 65/4815* (2013.01); *B29C 65/5057* (2013.01); *B29C 66/1122* (2013.01); *B29C 66/45* (2013.01); *B29C 66/721* (2013.01); *B29C 66/7212* (2013.01); *B29C 66/7392* (2013.01); *B29C 66/7394* (2013.01); *B29C 66/73921* (2013.01); *B29K 2063/00* (2013.01); *B29K 2079/085* (2013.01); *B29K 2105/06* (2013.01); *B29K 2105/167* (2013.01); *B29K 2307/04* (2013.01); *B29K 2309/08* (2013.01); *B29L 2031/3076* (2013.01); *B29L 2031/3082* (2013.01); *B29L 2031/3085* (2013.01); *B33Y 10/00* (2014.12); *B33Y 70/00* (2014.12); *C08G 2261/3442* (2013.01); *C08G 2261/45* (2013.01); *C08G 2261/60* (2013.01); *C08J 2379/08* (2013.01)

(56) References Cited

U.S. PATENT DOCUMENTS

| | | | |
|---|---|---|---|
| 5,260,404 A * | 11/1993 | Whiteley | C08G 73/10 528/125 |
| 10,011,685 B2 | 7/2018 | Childers et al. | |
| 2015/0337082 A1* | 11/2015 | Pratte | C08G 65/48 525/436 |
| 2015/0337183 A1* | 11/2015 | Pratte | C09J 171/00 156/60 |
| 2018/0305497 A1 | 10/2018 | Childers et al. | |

FOREIGN PATENT DOCUMENTS

| | | |
|---|---|---|
| WO | 2015177550 A1 | 11/2015 |
| WO | 2015197618 A1 | 12/2015 |

OTHER PUBLICATIONS

P.J. Horner and R. H. Whiteley, Aromatic Ether—Ketone—'X' Polymers, J. Mater. Chem., 1991, 1(2), pp. 271-280.

Bin Huang et al, "Synthesis and characterization of novel copolymers of poly (ether ketone ketone) and poly (ether ketone sulfone imide)", Polymer Bulletin, Springer, Berlin, DE, vol. 69, No. 6, Apr. 13, 2012 (Apr. 13, 2012), pp. 661-673, XP035101217, ISSN: 1436-2449, DOI: 10.1007/S00289-012-0753-7, pp. 663-664.

European Search Report for application No. 17159673.7-1377 dated Jul. 11, 2017.

* cited by examiner (III)

(IV)

POLYARYLETHER KETONE IMIDE ADHESIVES

CROSS-REFERENCE TO RELATED APPLICATIONS

This application is a continuation of U.S. patent application Ser. No. 16/023,171 filed Jun. 29, 2018, which has issued as U.S. Pat. No. 10,465,046 on Nov. 5, 2019, which is a continuation of U.S. patent application Ser. No. 15/068,249 filed Mar. 11, 2016, which has issued as U.S. Pat. No. 10,011,685 on Jul. 3, 2018. The above-referenced applications are hereby incorporated by reference in their entirety.

FIELD

Aspects of the present disclosure generally relate to polyarylether ketones and methods of use.

BACKGROUND

A vehicle, such as an aircraft, contains many components adhered to one another by adhesives and/or fasteners. Adhesives and fasteners must withstand chemical, thermal, and physical conditions experienced by the vehicle. Adhesives offer greater performance, better design efficiency, and lower weight as compared to fasteners used for connecting the vehicle/aircraft components to one another. In particular, thermosets chemically or physically join vehicle/aircraft components by co-cure or co-bonding processes. However, co-curing involves expensive, precision tooling to properly locate and maintain the vehicle components as well as control of the thermoset resin distribution throughout the curing process. Additionally, co-cured structures typically suffer thickness control issues and ply waviness due to undesirable viscosity of an adhesive. Alternatively, co-bonding involves less extensive tooling but adds the costly labor of surface preparation for the surfaces of the vehicle components to be joined.

Regarding thermoset materials, thermosets have components that are typically fabricated with a peel ply on the surfaces to be joined, which is removed prior to joining, coupled with a surface preparation process such as grit blasting, plasma etching, and or hand sanding of the surfaces to be joined, and followed by bonding of those surfaces with an adhesive. Adhesives are typically thermosets or thermoplastics, such as poly ether ketone ketone (PEKK) or poly ether ether ketone (PEEK). However, thermoplastics are inherently more difficult for adhesive bonding applications in comparison to thermosets due to the chemical nature of poly aryl ether ketone matrix, and their associated processing temperatures when used in structural applications.

Low cost thermoplastics for film joining (adhesion) processes for vehicle components typically employ a melting/fused joining rather than a curing adhesive system. Ideal processing parameters for such a thermoplastic would include:

about 355° C.-385° C. maximum processing temperature for thermoplastic co-consolidation without polymer degradation Glass transition temperature below about 190° C. for joining thermoset applications without degrading the thermoset component(s)

Polymer that is at least partially amorphous so that crystal formations do not inhibit molecular diffusion at a film to film interface Polymer should have environmental/chemical resistance equal to or better than vehicle base structures (i.e., vehicle components and, if present, other layers on the components)

Polymer molecular weight should be balanced to provide good mechanical properties while providing rheological properties that promote chain mobility close to the glass transition temperature Polymer should have adequate adhesion ability Existing adhesives do not possess ideal properties. For example, existing materials do not have a low enough processing temperature for suitable use with thermoset materials or the materials degrade at the processing temperature of thermoplastic composites. Polyether ether ketone (PEEK) polymers, for example, have high strength, but processing temperatures for PEEK polymers are high (generally above 355° C.). Furthermore, PEEK polymers are expensive and do not possess sufficiently high Tg values for all applications.

There is a need in the art for polymers that may be used in thermoplastic prepregs/thermosets and/or as an adhesive in vehicle/aircraft structures.

SUMMARY

In some aspects, a composition includes one or more polymers of formula (IV):

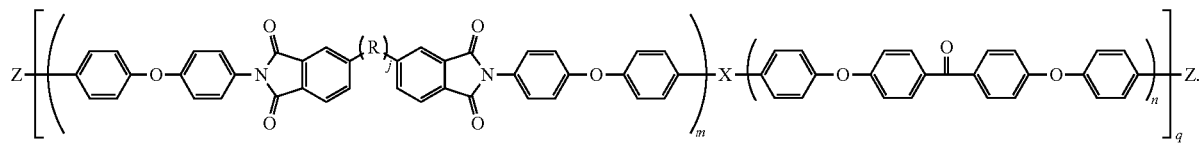

X is selected from

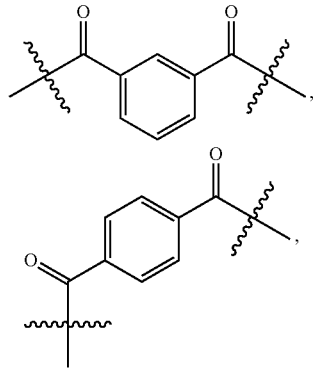

or combinations thereof. Z is selected from —H,

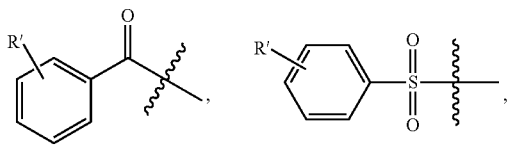

and combinations thereof, where R' is selected from —H, halo, C1-C20 alkyl, cyano, or combinations thereof.

R is selected from

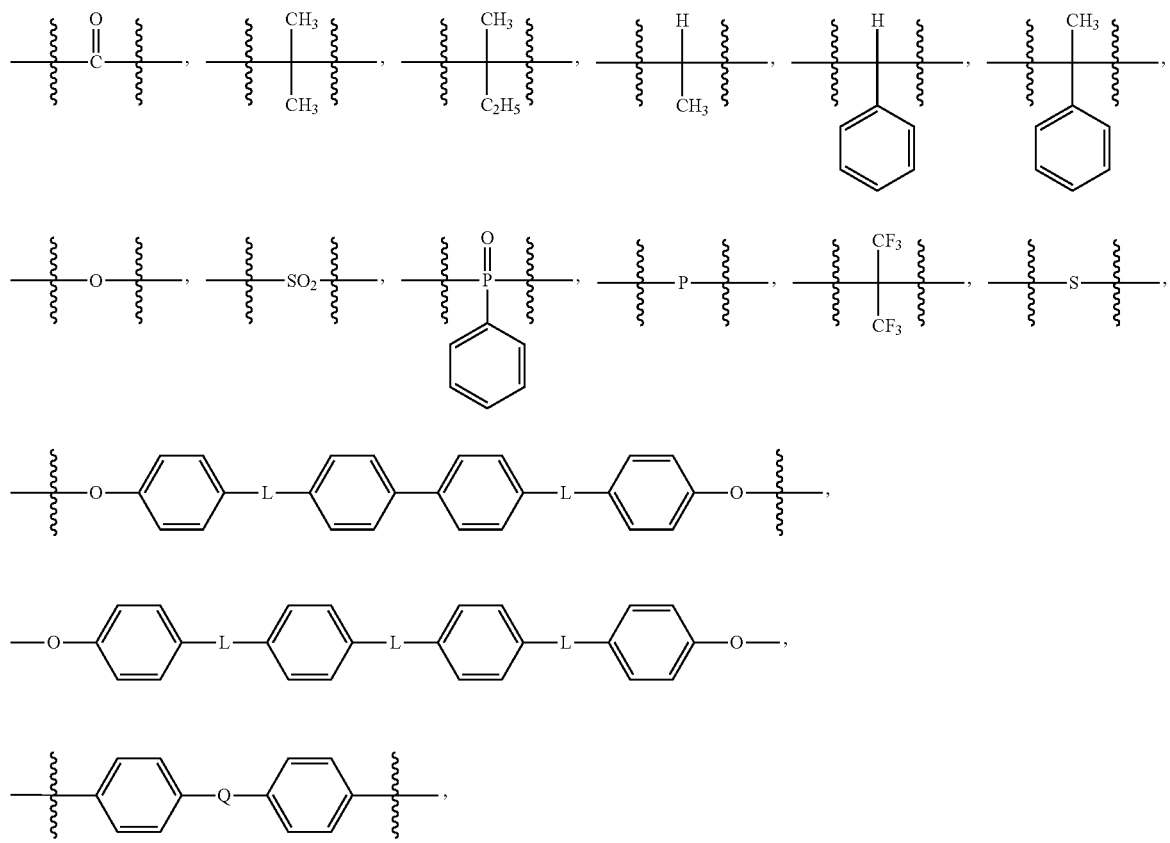

or combinations thereof. L is selected from —CH₂—, —(CH₃)₂C—, —O—, —S—, —SO₂—, —CO—, or combinations thereof. Q is selected from —S—, —SO₂—, —(CF₃)₂C—, —O—, —(CH₃)₂C—, or combinations thereof. j is a positive integer, m is a positive integer, n is a positive integer, and q is a positive integer. The molecular weight of at least one of the one or more polymers of formula (IV) is between about 50 kDa and about 150 kDa.

In some aspects, a composition includes one or more reaction products of:

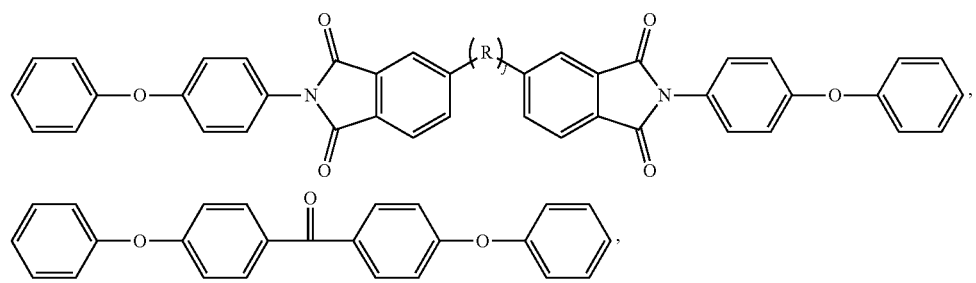

and at least one of

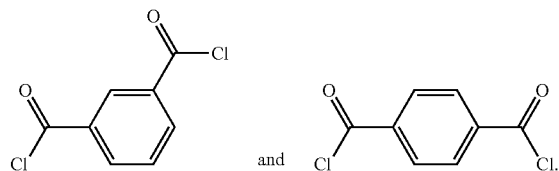 [SMILES: O=C(Cl)c1cccc(C(=O)Cl)c1 ; O=C(Cl)c1ccc(C(=O)Cl)cc1]

R is selected from

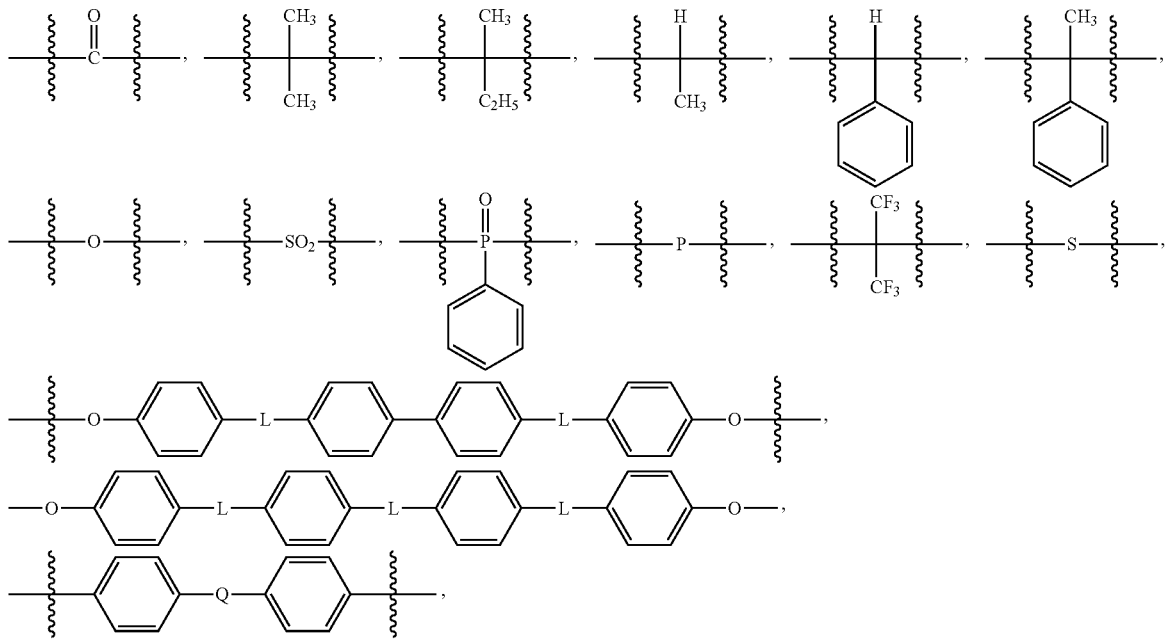

or combinations thereof. L is selected from —CH$_2$—, —(CH$_3$)$_2$C—, —O—, —S—, —SO$_2$—, —CO—, or combinations thereof. Q is selected from —S—, —SO$_2$—, —(CF$_3$)$_2$C—, —O—, —(CH$_3$)$_2$C—, or combinations thereof. j is a positive integer. The molecular weight of at least one of the one or more reaction products is between about 50 kDa and about 150 kDa.

BRIEF DESCRIPTION OF THE DRAWINGS

So that the manner in which the above recited features of the present disclosure can be understood in detail, a more particular description of the disclosure, briefly summarized above, may be had by reference to aspects, some of which are illustrated in the appended drawings. It is to be noted, however, that the appended drawings illustrate only typical aspects of this present disclosure and are therefore not to be considered limiting of its scope, for the present disclosure may admit to other equally effective aspects.

To facilitate understanding, identical reference numerals have been used, where possible, to designate identical elements that are common to the figures. It is contemplated that elements and features of one aspect may be beneficially incorporated in other aspects without further recitation.

DETAILED DESCRIPTION

Figure 1:
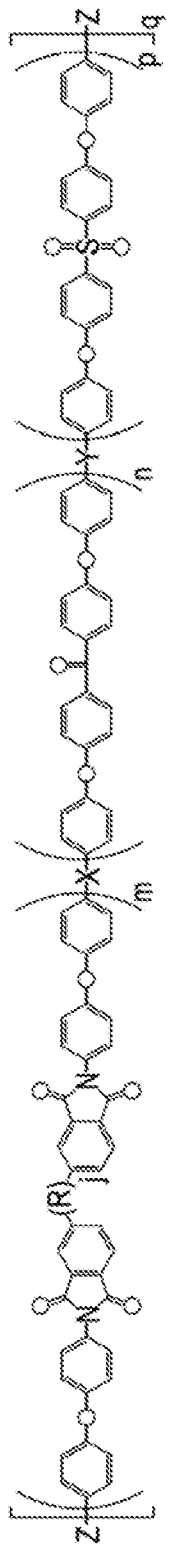
FIG. 1 illustrates chemical structures of general Formula (I).

The descriptions of the various aspects of the present disclosure have been presented for purposes of illustration, but are not intended to be exhaustive or limited to the aspects disclosed. Many modifications and variations will be apparent to those of ordinary skill in the art without departing from the scope and spirit of the described aspects. The terminology used herein was chosen to best explain the principles of the aspects, the practical application or technical improvement over technologies found in the marketplace, or to enable others of ordinary skill in the art to understand the aspects disclosed herein.

Aspects of the present disclosure generally describe polyarylether ketones and methods of use.

In general, polyimides (not copolymers) have a solvent resistance that is ideal, but processing temperatures are very high, which drastically increases the cost of these polymers. Polyethersulfones (not copolymers) are generally tough polymers having very high Tg values, but poor chemical resistance. Thus, imide monomers of polymers of the present disclosure provide high Tg values, good solvent resistance, and thermal stability, while sulfone monomers of polymers of the present disclosure provide high Tg values, overall durability, and thermal stability.

Imide monomers include ether imide ether imide ether (EIEIE) and derivatives thereof. In some aspects, EIEIE is of the general structure:

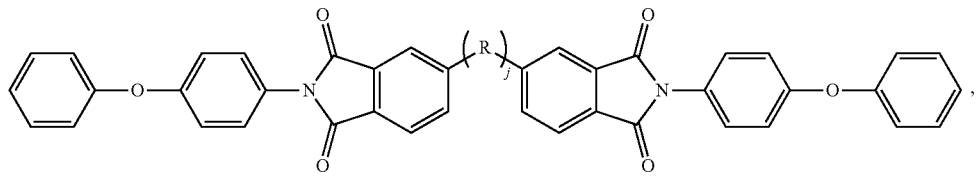

where R is selected from

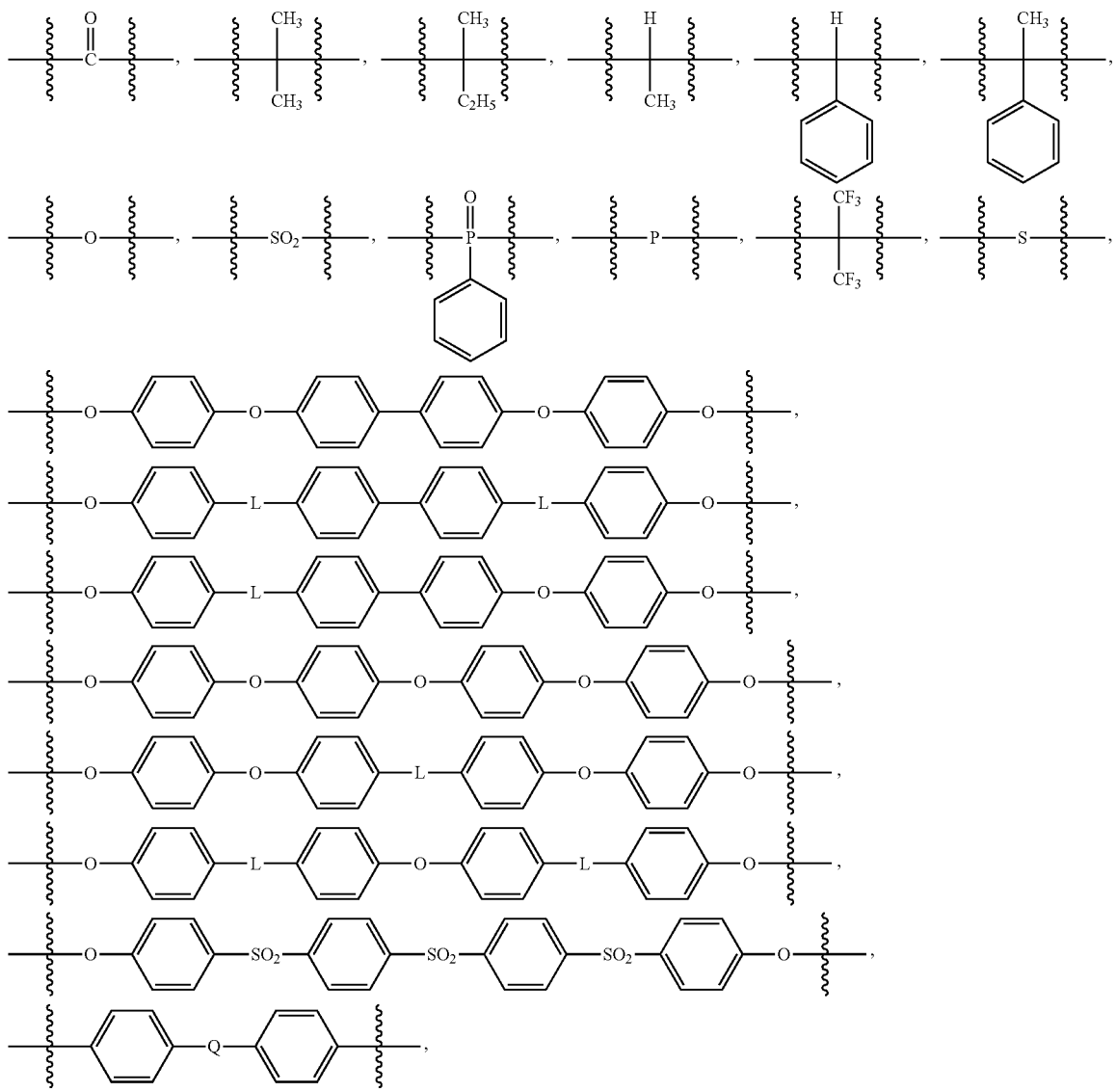

and combinations thereof, where L is selected from —CH$_2$—, —(CH$_3$)$_2$C—, —O—, —S—, —SO$_2$— or —CO—, where Q is selected from —S—, —SO$_2$— or —(CF$_3$)$_2$C—, —O—, —(CH$_3$)$_2$C—, and where j is a positive integer. In some aspects, the molecular weight of the EIEIE does not exceed about 3 kDa.

Sulfone monomers include ether sulfone ether (ESE) and derivatives thereof. In some aspects, ESE is of the structure:

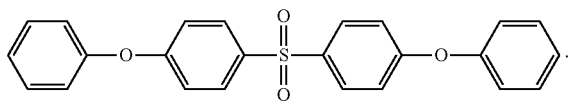

Ketone monomers include ether ketone ether (EKE) and derivatives thereof. In some aspects, EKE is of the structure:

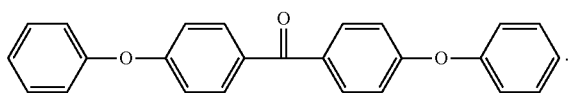 [SMILES: O=C(c1ccc(Oc2ccccc2)cc1)c1ccc(Oc2ccccc2)cc1]

An EKE monomer may be present in a polymer backbone as a majority monomer, which provides some processing improvements. For example, a polymer may comprise greater than about 33 mol % of EKE as compared to EIEIE and ESE. In other aspects, a polymer comprises greater than about 50 mol % EKE as compared to EIEIE. Furthermore, in some aspects, the ratio of EKE to EIEIE to ESE may be adjusted to optimize polymer properties.

Furthermore, including isophthaloyl chloride (ICP) and terephthaloyl chloride (TCP) for syntheses of polymers of the present disclosure provides additional control of the crystallinity of the polymer, e.g. tailoring amorphous and crystalline blocks of a copolymer.

Isophthaloyl chloride (ICP):

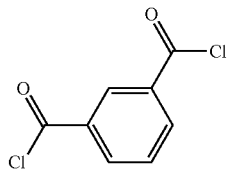 [SMILES: O=C(Cl)c1cccc(C(=O)Cl)c1]

Terephthaloyl chloride (TCP):

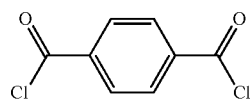

In some aspects, polymers of the present disclosure have Tg values between about 140° C. and about 225° C., for example about 140° C., 145° C., 150° C., 155° C., 160° C., 165° C., 170° C., 175° C., or 180° C. In some aspects, polymers of the present disclosure have Tm values between about 200° C. and about 450° C., such as between about 330° C. and about 355° C., for example about 330° C., 335° C., 340° C., 345° C., 350° C., or 355° C. In some aspects, polymers of the present disclosure have intrinsic viscosity values between about 1 and about 3, such as about 1.5 and about 2.4, for example 1.5 or 2.4. In some aspects, polymers of the present disclosure have a molecular weight between about 10 kDa and about 150 kDa, such as about 50 kDa and about 120 kDa, such as about 90 kDa and about 110 kDa.

In some aspects, a composition includes one or more polymers of formulae (I), (II), or (III):

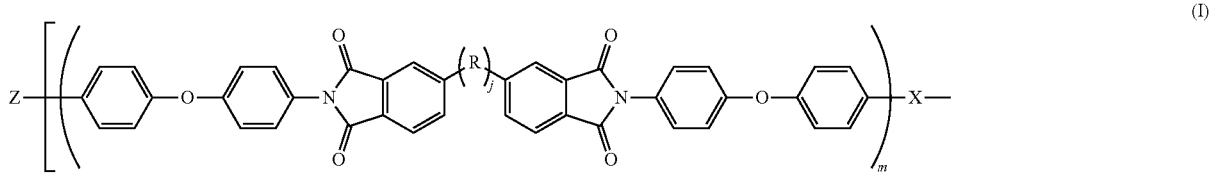

(I)

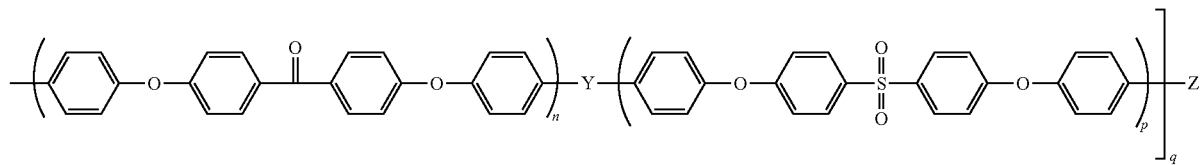

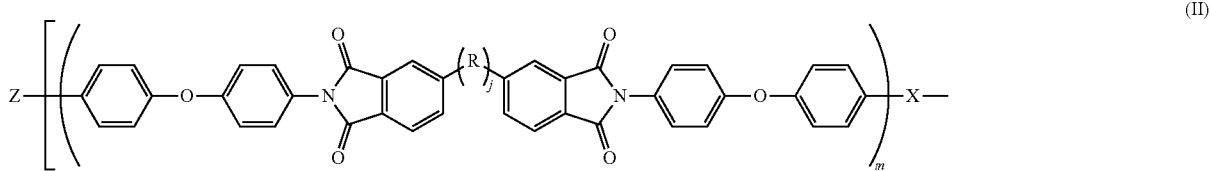

(II)

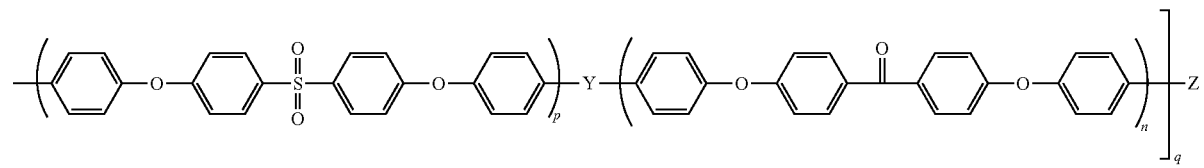

-continued
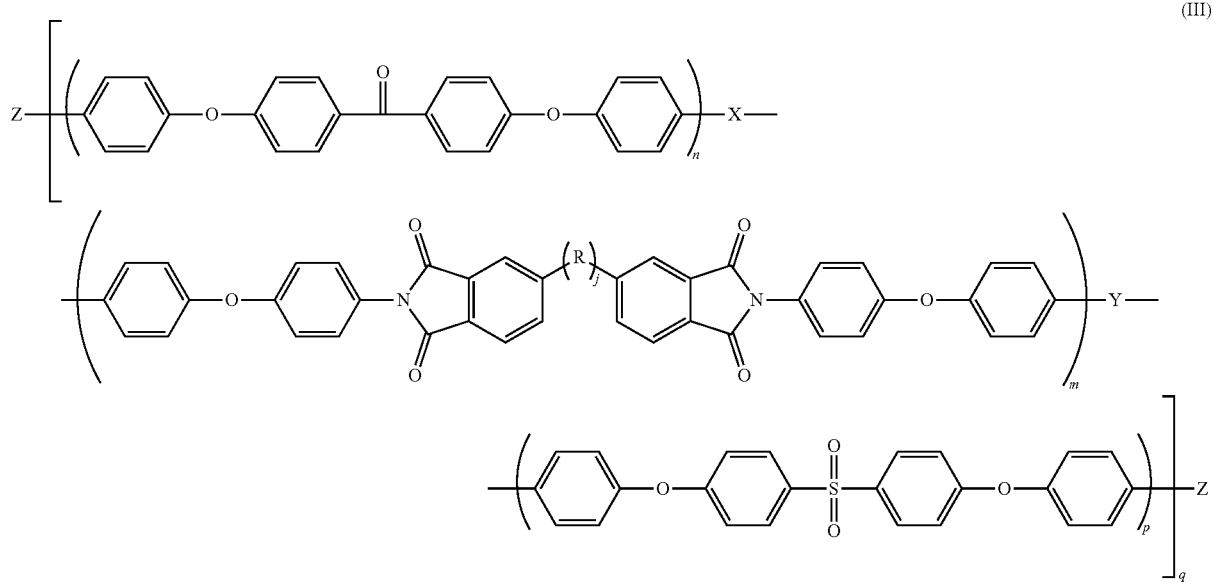
X is selected from
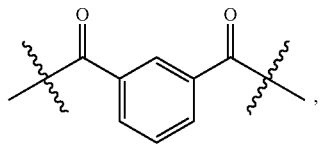
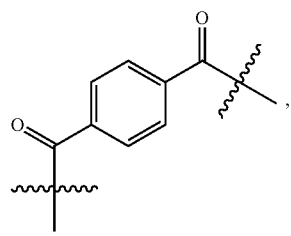
and combinations thereof. Y is selected from
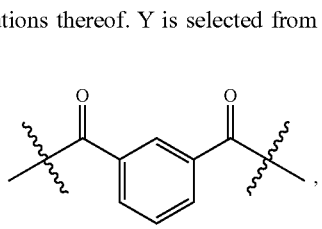
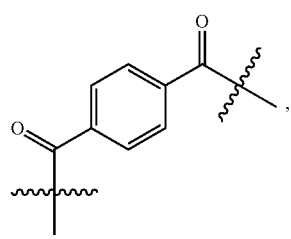
and combinations thereof. In some aspects, a ratio
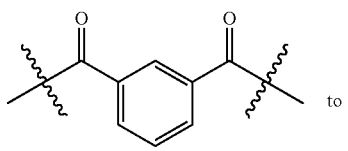 to
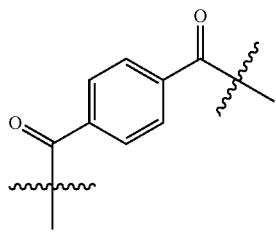
of is between about 1:1 and about 1:2.
Z is selected from —H,
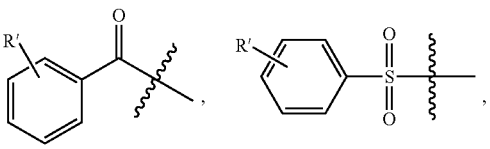
and combinations thereof, where R' is —H, halo, C1-C20 alkyl, cyano, or combinations thereof.

R is selected from

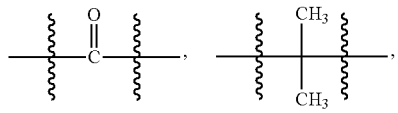

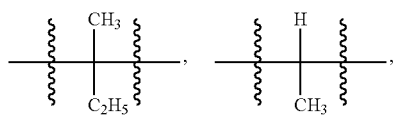

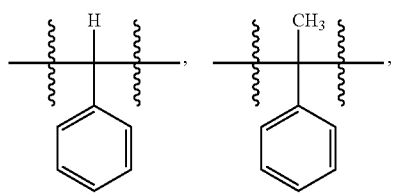

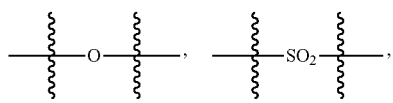

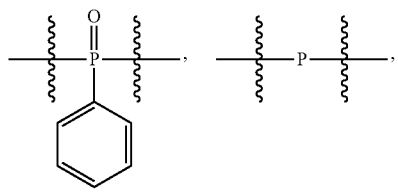

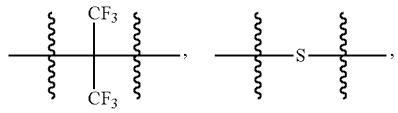

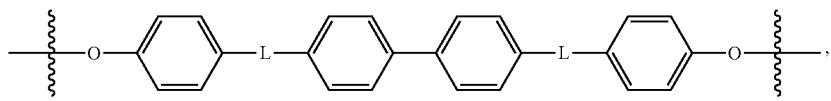

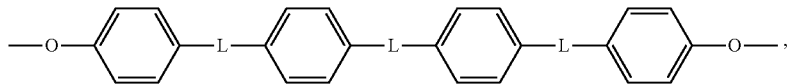

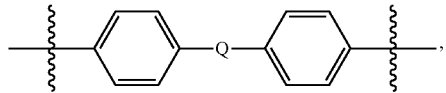

and combinations thereof. L is selected from —$CH_2$—, —$(CH_3)_2C$—, —O—, —S—, —$SO_2$—, —CO—, and combinations thereof. Q is selected from —$CH_2$—, —S—, —$SO_2$— or —$(CF_3)_2C$—, —O—, —$(CH_3)_2C$—, and combinations thereof.

j is a positive integer, such as between about 1 and about 50, such as about 1 and about 10. m is a positive integer, such as between about 1 and about 200, such as about 1 and about 100. n is a positive integer, such as between about 1 and about 200, such as about 1 and about 100. p is a positive integer, such as between about 1 and about 200, such as about 1 and about 100. q is a positive integer, such as between about 1 and about 2,000, such as about 200 and about 1,000. In some aspects, a ratio of m to n is between about 1:1 and about 1:2. A ratio of m to p may be between about 1:1 and about 1:2, and a ratio of n to p may be between about 1:1 and about 1:2.

The molecular weight of the at least one of the one or more polymers of formulae (I), (II), or (III) may be between about 10 kDa and about 150 kDa. In some aspects, the molecular weight of at least one of the one or more polymers is between about 50 kDa and about 120 kDa. The molecular weight of at least one of the one or more polymers may be between about 90 kDa and about 110 kDa.

In some aspects, the molecular weight of each moiety of the structure:

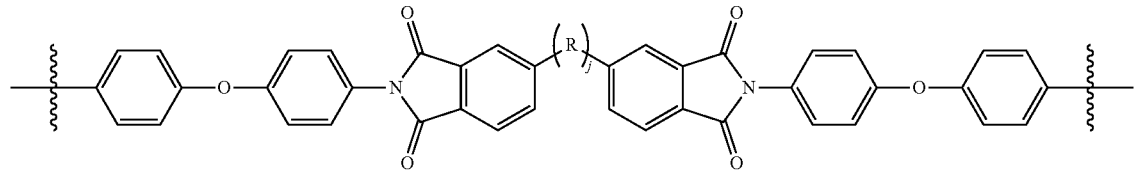

of formulae (I), (II), or (III) does not exceed about 3 kDa. In some aspects, the moiety:

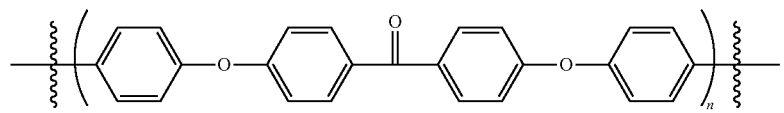

is greater than about 33 mol % of the molecular weight of at least one of the one or more polymers of formulae (I), (II), or (III). The moiety:

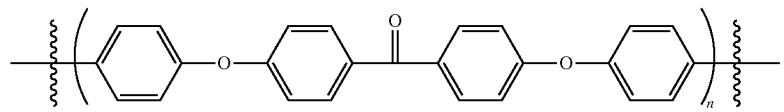

may be greater than about 50 mol % of at least one of the one or more polymers.

In some aspects, a composition includes one or more polymers of formulae (I), (II), or (III) and has a glass transition temperature between about 135° C. and about 225° C. A composition including one or more polymers of formulae (I), (II), or (III) may have a glass transition temperature between about 135° C. and about 190° C., for example about 140° C., 145° C., 150° C., 155° C., 160° C., 165° C., 170° C., 175° C., or 180° C. A composition including one or more polymers of formulae (I), (II), or (III) may have a melting temperature between about 200° C. and about 450° C., for example about 330° C., 335° C., 340° C., 345° C., 350° C., or 355° C.

In some aspects, at least one of the one or more polymers of formulae (I), (II), or (III) is a block copolymer. q may be 1, m may be an integer between about 1 and about 1,000, such as about 1 and about 100, and n may be an integer between about 1 and about 1,000, such as about 1 and about 100. In some aspects, at least one of the one or more polymers of formulae (I), (II), or (III) is a random copolymer. q may be an integer between 2 and about 1,000, m may be an integer between about 1 and about 100, and n may be an integer between about 1 and about 100.

In some aspects, a composition including at least one of the one or more polymers of formulae (I), (II), or (III) further includes a fiber material. The fiber material comprises, for example, graphite, fiberglass, nylon, aramid polymers, spectra, and mixtures thereof.

As used herein, a vehicle component includes any component of a vehicle, such as a structural component such as a panel or joint of an aircraft, automobile, etc. In some aspects, a vehicle component includes a composition having at least one of the one or more polymers of formulae (I), (II), or (III). The composition may have a glass transition temperature between about 135° C. and about 225° C., for example about 140° C., 145° C., 150° C., 155° C., 160° C., 165° C., 170° C., 175° C., or 180° C., and a melting temperature between about 200° C. and about 450° C., for example about 330° C., 335° C., 340° C., 345° C., 350° C., or 355° C. The vehicle component may be a tail cone, a panel, a coated lap joint between two or more panels, a wing-to-fuselage assembly, structural aircraft composite, fuselage body-joint and/or wing rib-to-skin joint.

In some aspects, a method includes using a composition having at least one of the one or more polymers of formulae (I), (II), or (III) as an adhesive. The molecular weight of at least one of the one or more polymers may be between about 10 kDa and about 150 kDa. In some aspects, a method includes coating a surface with a composition having at least one of the one or more polymers of formulae (I), (II), or (III). The molecular weight of at least one of the one or more polymers may be between about 10 kDa and about 150 kDa. The method may include contacting the coated surface with a second surface and heating the composition to above about 355° C. The coated surface may include a thermoplastic prepreg, thermoset prepreg, and/or metal. Heating the composition to above about 355° C. may consolidate the thermoplastic prepreg (or cure the thermoset prepreg). The second surface may include a thermoplastic prepreg, thermoset prepreg, and/or metal, and heating the composition to above about 355° C. may consolidate the thermoplastic prepreg (or cure the thermoset prepreg) of the first surface and the thermoplastic prepreg (or thermoset prepreg) of the second surface. The method may further include coating the second surface with a composition having at least one of the one or more polymers of formulae (I), (II), or (III) to form a second coated surface. In some aspects, the first surface and the second surface is each a surface of a vehicle component. In some aspects, a method includes forming a three dimensional structure using at least one of the one or more polymers of formulae (I), (II), and (III). One or more polymers of formulae (I), (II), and (III) may be deposited onto a three dimensional structure using any suitable deposition method including conventional 3D printing methods. Alternatively, at least a first part of a three dimensional structure may be formed using the one or more polymers of formulae (I), (II), and (III). The three dimensional structure may further include a reinforcement agent. The reinforcement agent may improve structural integrity of the three dimensional structure. The reinforcement agent may be included in a mixture containing one or more polymers of formulae (I), (II), and (III) that is then deposited to form a three dimensional structure (or deposit a layer onto a three dimensional structure) using any suitable deposition method such as a conventional 3D printing method. In some aspects, the reinforcement agent is selected from glass, carbon fibers, chopped carbon fibers, carbon black, and carbon nanotubes. The three dimensional structure may be formed using any suitable 3D printing process, such as fused filament fabrication and/or selective laser sintering.

In some aspects, a composition includes one or more reaction products of:

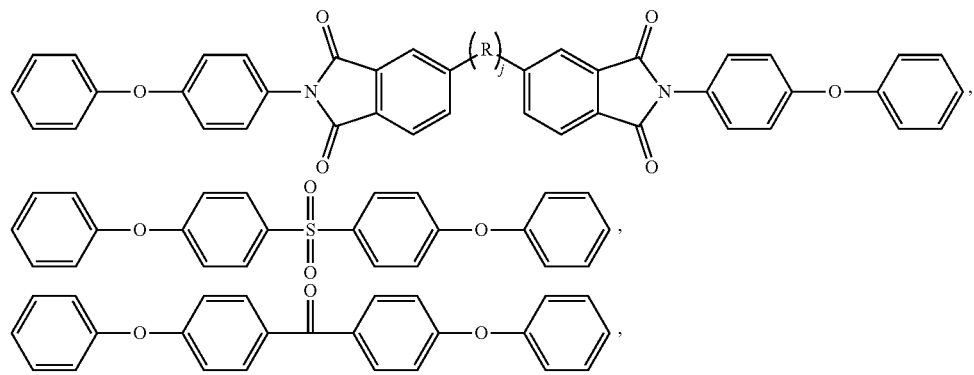

and at least one of

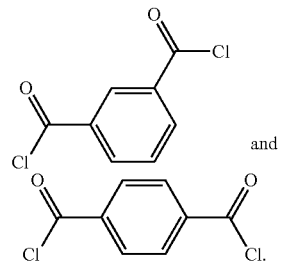

R is selected from

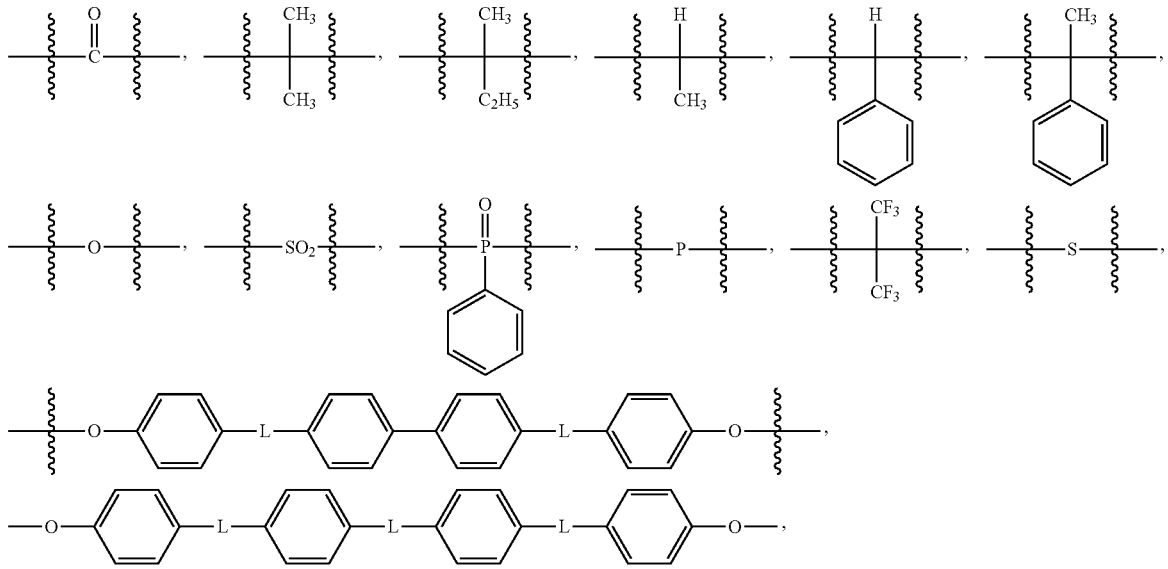

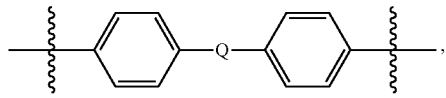

and combinations thereof. L is selected from —CH$_2$—, —(CH$_3$)$_2$C—, —O—, —S—, —SO$_2$—, —CO—, and combinations thereof. Q is selected from —S—, —SO$_2$—, —(CF$_3$)$_2$C—, —O—, —(CH$_3$)$_2$C—, and combinations thereof. j is a positive integer, such as between about 1 and about 100, such as between about 1 and about 10. The molecular weight of at least one of the one or more reaction products is selected from between about 10 kDa and about 150 kDa. In some aspects, the molecular weight of

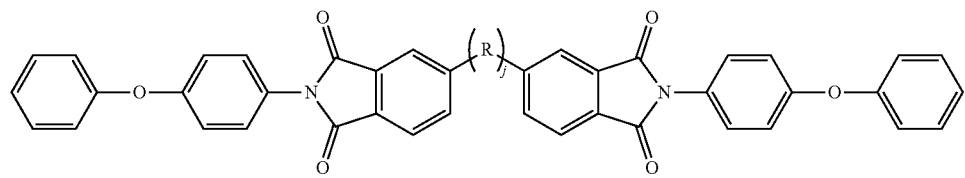

does not exceed about 3 kDa.

In some aspects, a composition includes one or more polymers of formula (IV):

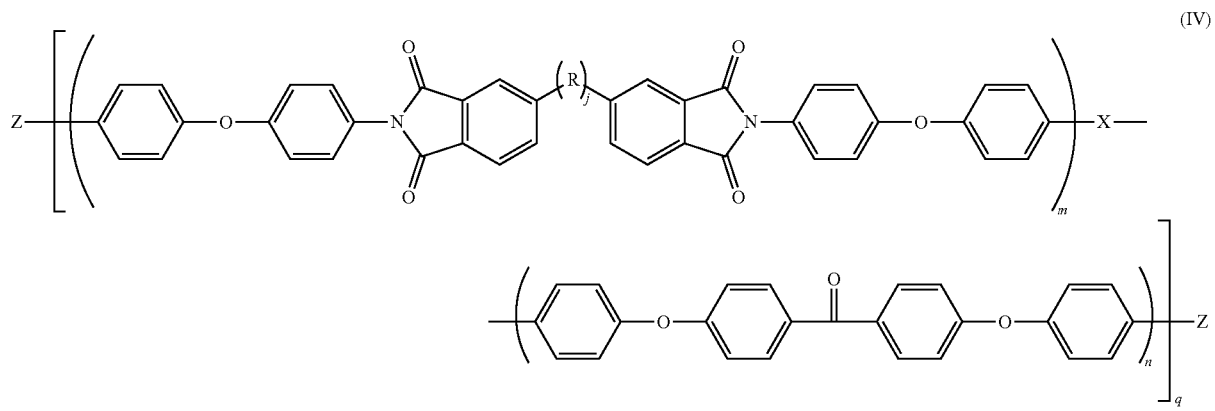

X is selected from

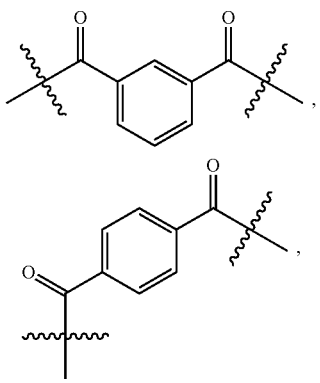

and combinations thereof. Z is selected from —H,

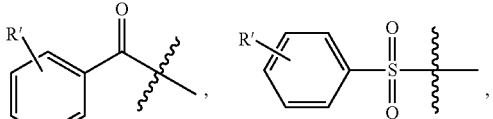

and combinations thereof, where R' is —H, halo, C1-C20 alkyl, cyano, or combinations thereof.

R is selected from

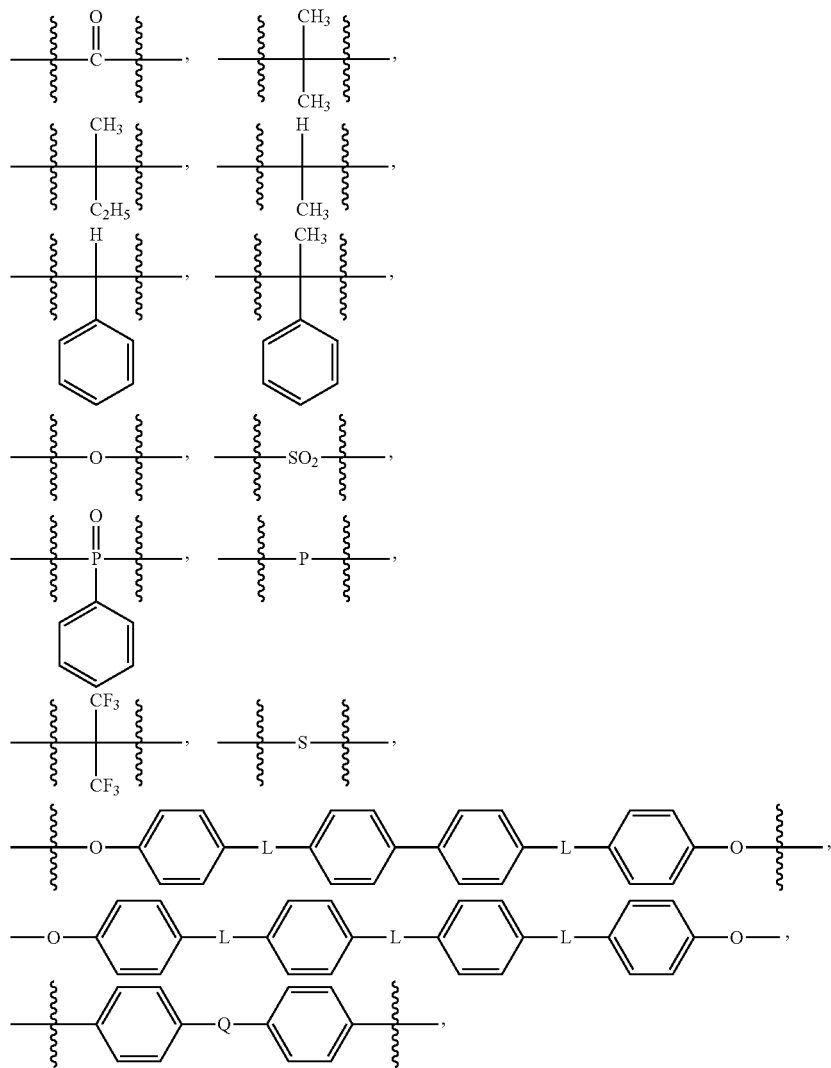

and combinations thereof.

L is selected from —CH$_2$—, —(CH$_3$)$_2$C—, —O—, —O—, —S—, —SO$_2$—, —CO—, and combinations thereof. Q is selected from —S—, —SO$_2$—, —(CF$_3$)$_2$C—, —O—, —(CH$_3$)$_2$C—, and combinations thereof. j is a positive integer, such as between about 1 and about 100, such as about 1 and about 10. m is a positive integer such as between about 1 and about 1,000, such as about 1 and about 100. n is a positive integer such as between about 1 and about 1,000, such as about 1 and about 10. q is a positive integer such as between about 1 and about 2,000, such as about 200 and about 1,000. In some aspects, a ratio of m to n is between about 1:1 and about 1:2. A ratio of

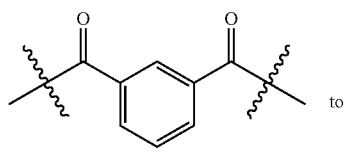 to

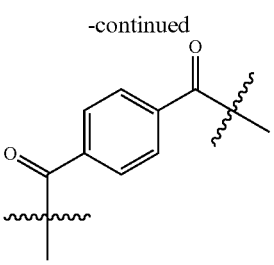

may be between about 1:1 and about 1:2.

In some aspects, the molecular weight of at least one of the one or more polymers of formula (IV) is between about 50 kDa and about 150 kDa. In some aspects, the molecular weight of at least one of the one or more polymers of formula (IV) is between about 90 kDa and about 110 kDa.

In some aspects, the molecular weight of each moiety of the structure:

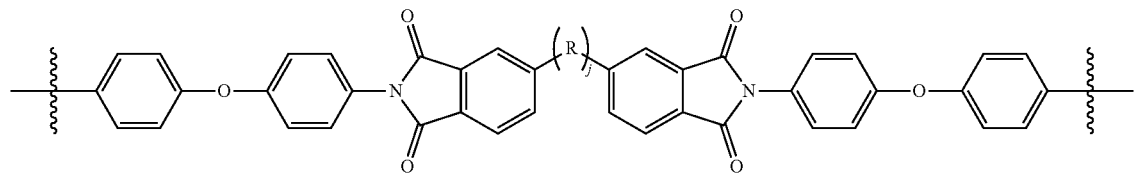

of formula (IV) does not exceed about 3 kDa. The moiety:

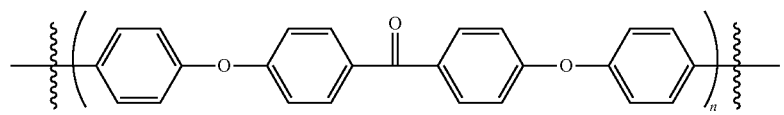

of formula (IV) may be greater than about 33 mol % of the molecular weight of at least one of the one or more polymers of formula (IV). In some aspects, the moiety:

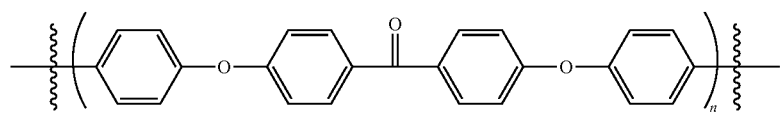

is greater than about 50 mol % of at least one of the one or more polymers of formula (IV).

In some aspects, a composition including at least one of the one or more polymers of formula (IV) has a glass transition temperature between about 135° C. and about 225° C., for example about 140° C., 145° C., 150° C., 155° C., 160° C., 165° C., 170° C., 175° C., or 180° C. A composition having at least one of the one or more polymers of formula (IV) may have a glass transition temperature between about 135° C. and about 190° C. and/or a melting temperature between about 200° C. and about 450° C., for example about 330° C., 335° C., 340° C., 345° C., 350° C., or 355° C.

At least one of the one or more polymers of formula (IV) may be a block copolymer. In some aspects, q may be 1, m is an integer between about 1 and about 1,000, such as about 1 and 100, and n is an integer between about 1 and about 1,000, such as about 1 and about 100. At least one of the one or more polymers of formula (IV) may be a random copolymer. In some aspects, q may be an integer between 2 and about 2,000, such as about 2 and about 1,000. m is an integer between about 1 and about 1,000, such as about 1 and about 100, and n is an integer between about 1 and about 1,000, such as about 1 and about 100.

In some aspects, a composition includes at least one of the one or more polymers of Formula (IV), where the moiety:

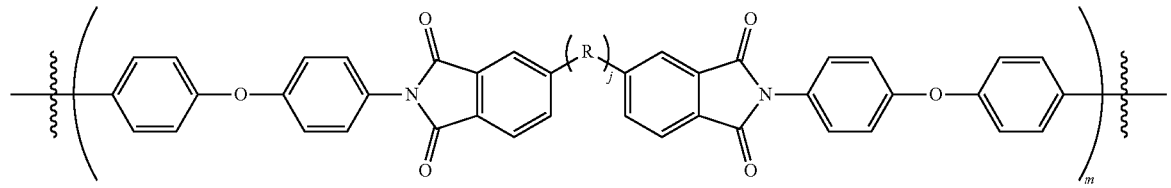

is about 17 mol % of the molecular weight of the polymer,
R is

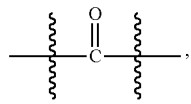

and j is 1. The moiety:

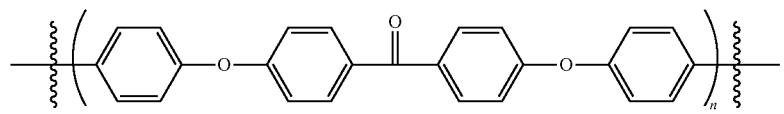

is about 32 mol % of the molecular weight of the polymer.
X is

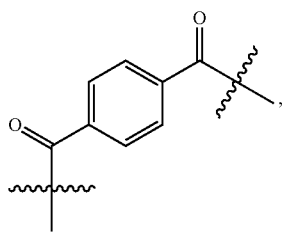 [SMILES: *C(=O)c1ccc(C(*)=O)cc1]

and X is about 46 mol % of the molecular weight of the polymer.

In some aspects, a composition includes at least one of the one or more polymers of Formula (IV), where the moiety:

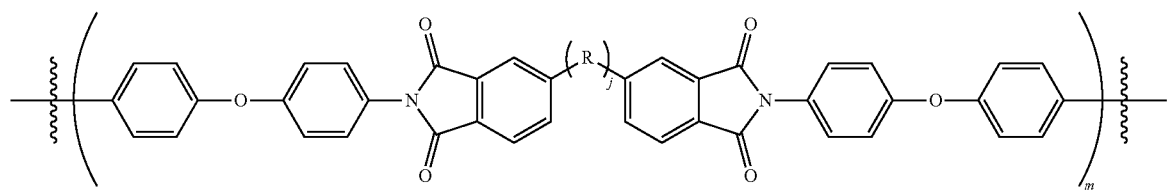

is about 23 mol % of the molecular weight of the polymer,
R is

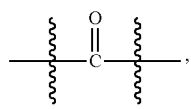

and j is 1. The moiety:

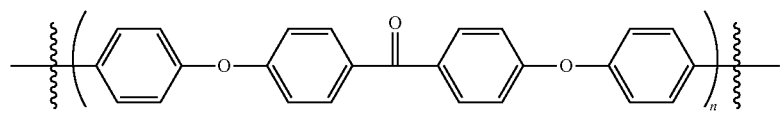

is about 29 mol % of the molecular weight of the polymer. The moiety:

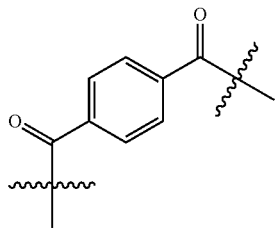 [SMILES: *C(=O)c1ccc(C(*)=O)cc1]

is about 24 mol % of the molecular weight of the polymer, and the moiety:

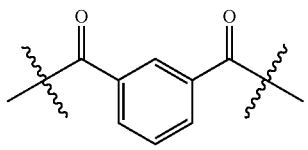 [SMILES: *C(=O)c1cccc(C(*)=O)c1]

is about 24 mol % of the molecular weight of the polymer.

In some aspects, a composition includes at least one of the one or more polymers of Formula (IV) and a fiber material. The fiber material may be graphite, fiberglass, nylon, aramid polymers, spectra, and mixtures thereof.

In some aspects, a vehicle component includes a composition that includes at least one of the one or more polymers of Formula (IV). The composition may have a glass transition temperature between about 135° C. and about 225° C., for example about 140° C., 145° C., 150° C., 155° C., 160° C., 165° C., 170° C., 175° C., or 180° C., and a melting temperature between about 200° C. and about 450° C., for example about 330° C., 335° C., 340° C., 345° C., 350° C., or 355° C. The vehicle component may be a tail cone, a panel, a coated lap joint between two or more panels, a wing-to-fuselage assembly, structural aircraft composite, fuselage body-joint or wing rib-to-skin joint.

In some aspects, a method includes using a composition that includes at least one of the one or more polymers of Formula (IV) as an adhesive. A method may include coating a surface with a composition having at least one of the one or more polymers of Formula (IV). In some aspects, a method includes coating a first surface with a composition that includes at least one of the one or more polymers of Formula (IV) to form a coated surface. The method includes contacting the coated surface with a second surface and heating the composition to above about 355° C. The first surface and/or the second surface may include a thermoplastic prepreg, thermoset prepreg, and/or metal. Heating the composition to above about 355° C. may consolidate the thermoplastic prepreg (or cure the thermoset prepreg) of the first surface and/or, if present, the thermoplastic prepreg (or thermoset prepreg) of the second surface. The method may include coating the second surface with a composition that includes at least one of the one or more polymers of Formula (IV) to form a second coated surface. The first surface and/or the second surface may be a surface of a vehicle component.

In some aspects, a method includes forming a three dimensional structure using at least one of the one or more polymers of formula (IV). One or more polymers of formula (IV) may be deposited onto a three dimensional structure using any suitable deposition method including conventional 3D printing methods. Alternatively, at least a first part of a three dimensional structure may be formed using the one or more polymers of formula (IV). The three dimensional structure may further include a reinforcement agent. The reinforcement agent may improve structural integrity of the three dimensional structure. The reinforcement agent may be included in a mixture containing one or more polymers of formula (IV) that is then deposited to form a three dimensional structure (or deposit a layer onto a three dimensional structure) using any suitable deposition method such as a conventional 3D printing method. In some aspects, the reinforcement agent is selected from glass, carbon fibers, chopped carbon fibers, carbon black, and carbon nanotubes. The three dimensional structure may be formed using any suitable 3D printing process, such as fused filament fabrication and/or selective laser sintering.

In some aspects, a composition includes one or more reaction products of:

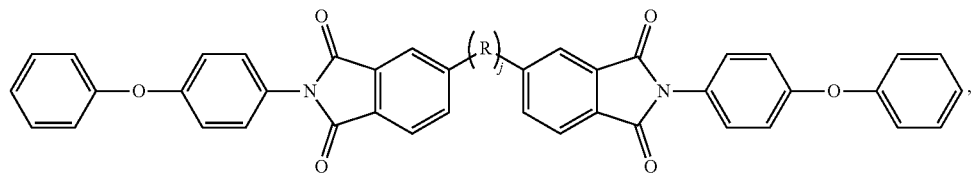

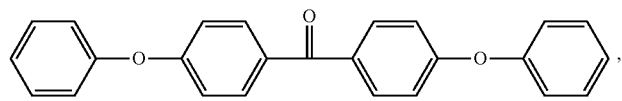

and at least one of

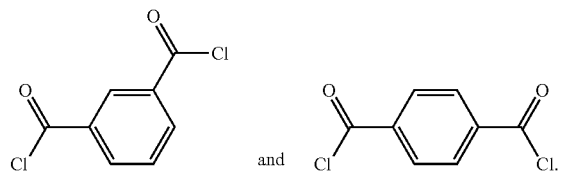 [SMILES: O=C(Cl)c1cccc(C(=O)Cl)c1 ; O=C(Cl)c1ccc(C(=O)Cl)cc1]

R is selected from

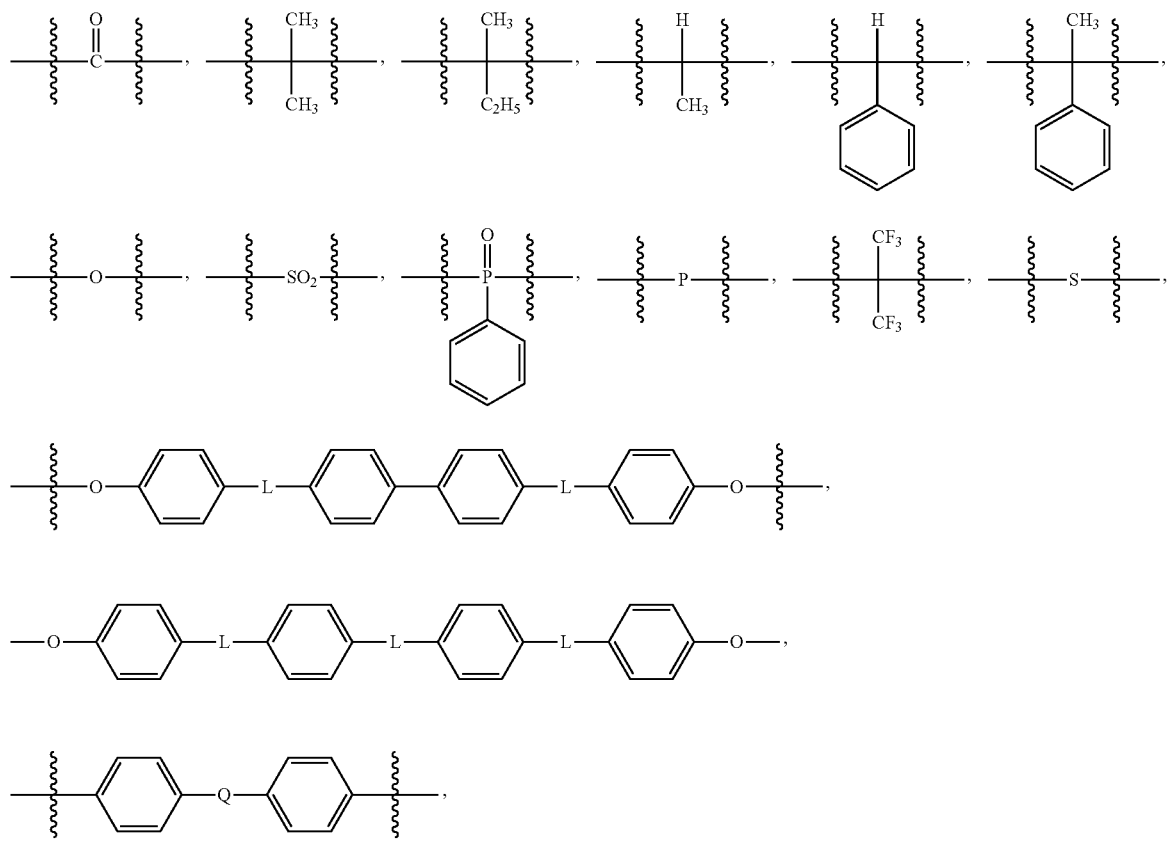

and combinations thereof. L is selected from —CH$_2$—, —(CH$_3$)$_2$C—, —O—, —S—, —SO$_2$—, —CO—, and combinations thereof. Q is selected from —S—, —SO$_2$—, —(CF$_3$)$_2$C—, —O—, —(CH$_3$)$_2$C—, and combinations thereof. j is a positive integer, such as between about 1 and about 100, such as about 1 and about 10. The molecular weight of at least one of the one or more reaction products is between about 50 kDa and about 150 kDa. In some aspects, the molecular weight of

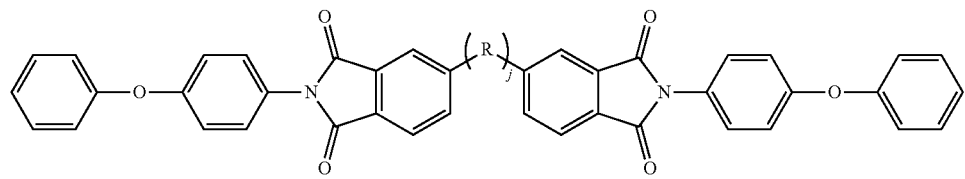

does not exceed about 3 kDa.

In some aspects, the one or more reaction products are formed from a reaction mixture that includes

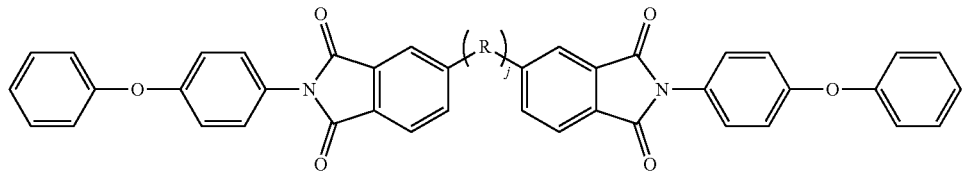

that is about 17 mol % of the reaction mixture, R is

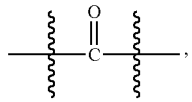

and j is 1,

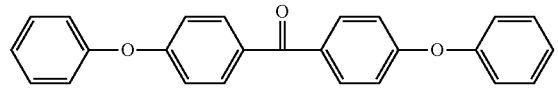

is about 32 mol % of the reaction mixture.

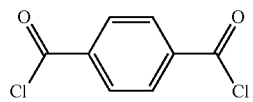

is about 46 mol % of the reaction mixture.

In some aspects, the one or more reaction products are formed from a reaction mixture that includes

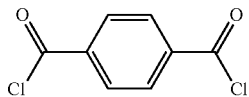

is about 24 mol % of the reaction mixture, and

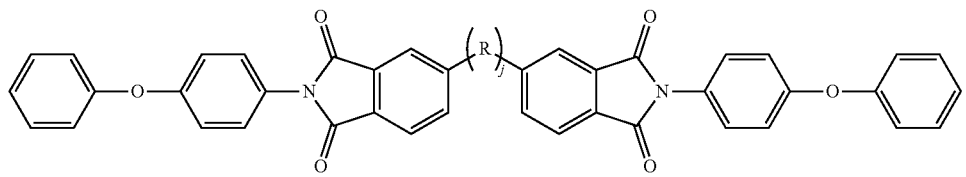

is about 24 mol % of the reaction mixture.

Dynamic scanning calorimetry (DSC) may be used to determine glass transition temperatures (Tg), melting temperatures (Tm), and crystallization temperatures (Tc) of polymers of the present disclosure. Furthermore, thermal gravimetric analysis provides degradation temperatures of the polymers.

Conditions for the DSC scans of the present disclosure: ASTM D3418 with a heating rate of 5° C. per minute. The sample is placed in a small aluminum pan (approx. 5-10 milligram sample). The sample is heated to 395° C. at 5° C./min. The sample is either (1) cooled at 5° C./min to room temperature, or (2) quenched by removing the sample from the test chamber and placing the sample on a room temperature metal surface. The sample is then heated again to 395° C. at 5° C./min.

Intrinsic viscosity may be used to determine the size of polymers (e.g., molecular weight(s)) of polymers of the present disclosure. Intrinsic viscosity (IV) refers to the mean intrinsic viscosity as determined by dissolving about 0.1 g of polymer in about 100 mL of concentrated sulfuric acid at 25° C. method involves solubilizing the polymer in sulfuric acid and then using an ubelode viscometer to determine the intrinsic viscosity.

that is about 23 mol % of the reaction mixture, R is

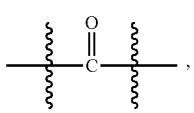 [SMILES: *C(*)=O]

and j is 1,

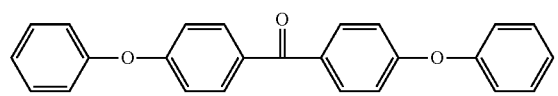 [SMILES: O=C(c1ccc(Oc2ccccc2)cc1)c1ccc(Oc2ccccc2)cc1]

is about 29 mol % of the reaction mixture.

Molecular weight of a composition of polymers is usually expressed in terms of a moment of the molecular weight distribution of the polymer mixture, defined as $$M_z = \frac{\sum m_i^z n_i}{\sum m_i^{z-1} n_i},$$

where $m_i$ is the molecular weight of the ith type of polymer molecule in the mixture, and $n_i$ is the number of molecules of the ith type in the mixture. $M_1$ is also commonly referred to as $M_n$, the "number average molecular weight". $M_2$ is also commonly referred to as $M_w$, the "weight average molecular weight". The compositions of polymers of the present disclosure may have $M_n$ and/or $M_w$ of between about 10 kDa and about 150 kDa, such as about 50 kDa and about 120 kDa, such as about 90 kDa and about 110 kDa.

Molecular weight distribution of a composition of polymers may be indicated by a polydispersity ratio $P_Z$, which may be defined as $$P_Z = \frac{M_{z+1}}{M_z},$$

where $M_Z$ is defined above. Polymer compositions of the present disclosure typically come from polymer mixtures having a polydispersity ratio $P_Z$ of between about 1 and about 3, for example about 2.

FIG. 1 illustrates chemical structures of general Formula (I). As shown in FIG. 1, polymers of the present disclosure include polymers of Formula (I):

where X may be

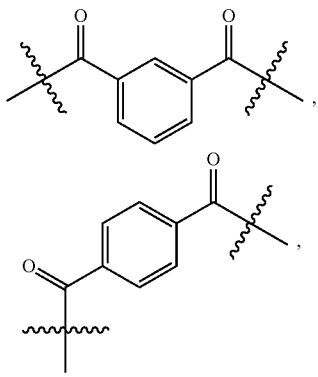

and combinations thereof. Y may be

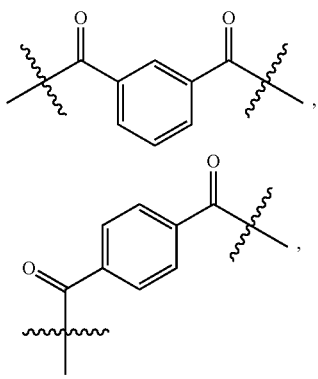

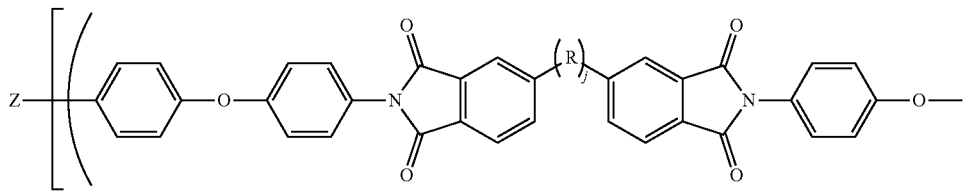

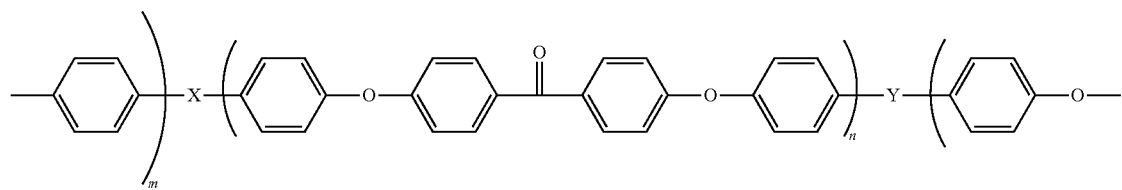

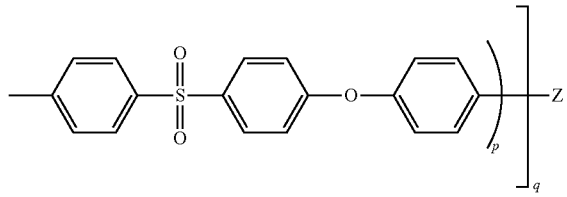

and combinations thereof. In some aspects, a ratio of

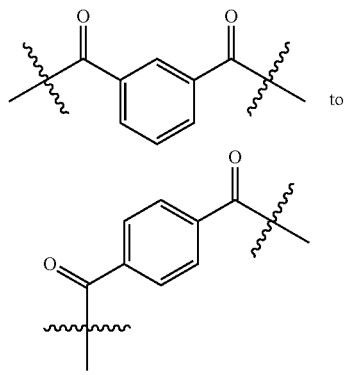

to is between about 1:1 and about 1:2.

Z may be —H,

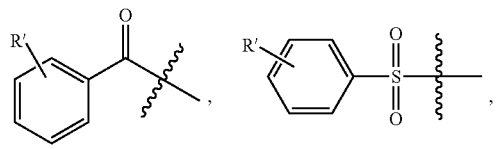

and combinations thereof, where R' is —H, halo, C1-C20 alkyl, cyano, or combinations thereof.

R may be selected from and combinations thereof. L may be —$CH_2$—, —$(CH_3)_2$C—, —O—, —S—, —$SO_2$—, —CO—, and combinations thereof. Q may be —S—, —$SO_2$— or —$(CF_3)_2$C—, —O—, —$(CH_3)_2$C—, and combinations thereof.

j is a positive integer, such as between about 1 and about 100, such as about 1 and about 10. m is a positive integer, such as between about 1 and about 1,000, such as about 1 and about 100. n is a positive integer, such as between about 1 and about 1,000, such as about 1 and about 10. p is a positive integer, such as between about 1 and about 1,000, such as about 1 and about 100. q is a positive integer, such as between about 1 and about 2,000, such as about 200 and about 1,000.

In some aspects, a ratio of m to n values of Formula (I) is between about 0.1:10 and about 10:0.1, such as about 1:1 and about 1:2. A ratio of m to p values of Formula (I) may be between about 0.1:10 and about 10:0.1, such as about 1:1 and about 1:2. A ratio of n to p values of Formula (I) may be between about 0.1:10 and about 10:0.1, such as about 1:1 and about 1:2. In some aspects, a ratio of

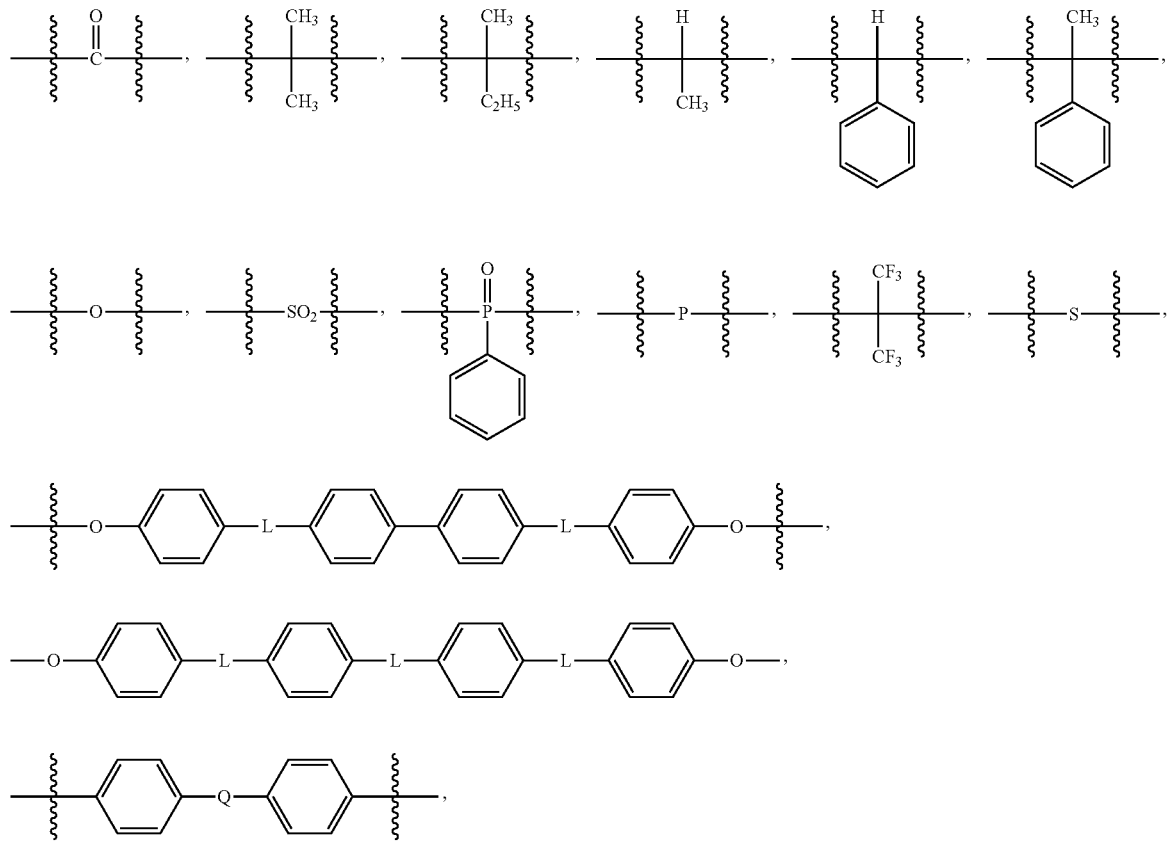

Figure 2:
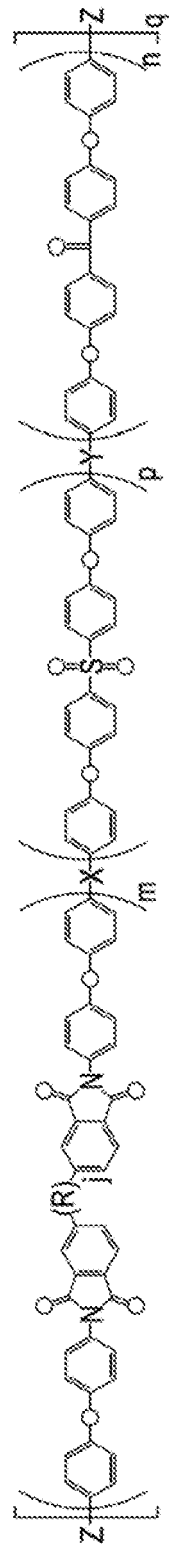
FIG. 2 illustrates chemical structures of general Formula (II).

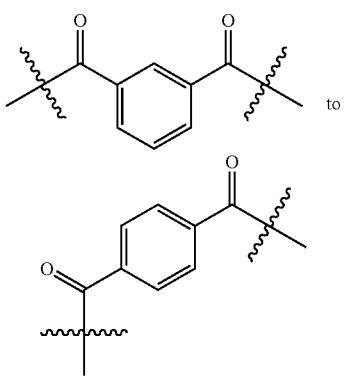 to
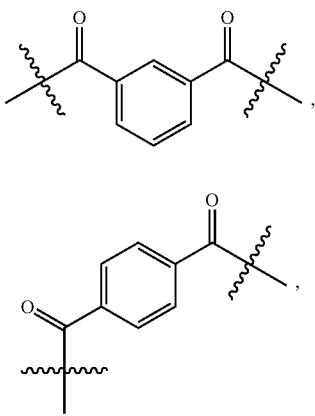
(for X and Y moieties of Formula (I)) is between about 0.1:10 and about 10:0.1, such as about 1:1 and about 1:2.
FIG. 2 illustrates chemical structures of general Formula (II). As shown in FIG. 2, polymers of the present disclosure further include polymers of formula (II):
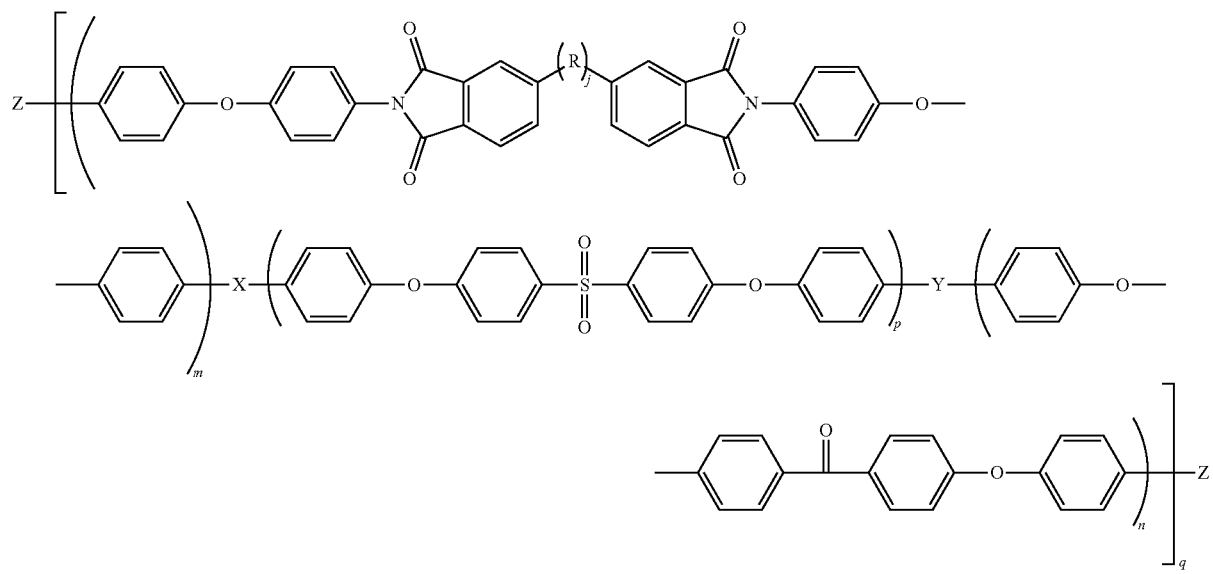
where X may be
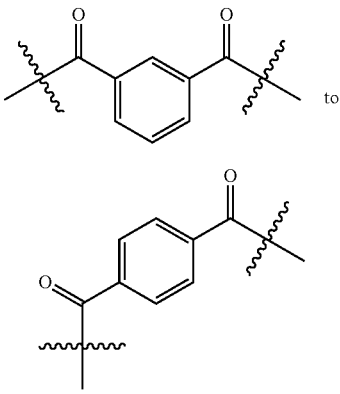
and combinations thereof. Y may be
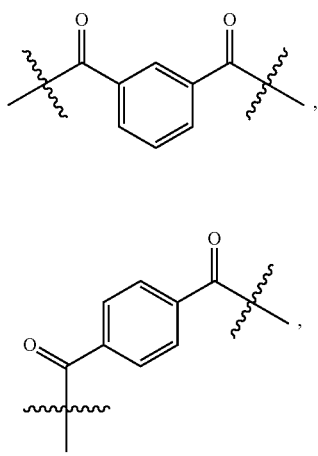
and combinations thereof. In some aspects, a ratio of
is between about 1:1 and about 1:2.

Z may be —H,

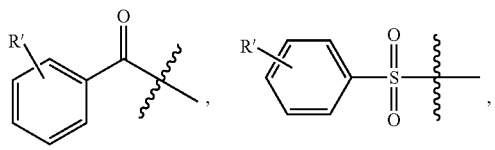

and combinations thereof, where R' is —H, halo, C1-C20 alkyl, cyano, or combinations thereof.

R may be selected from

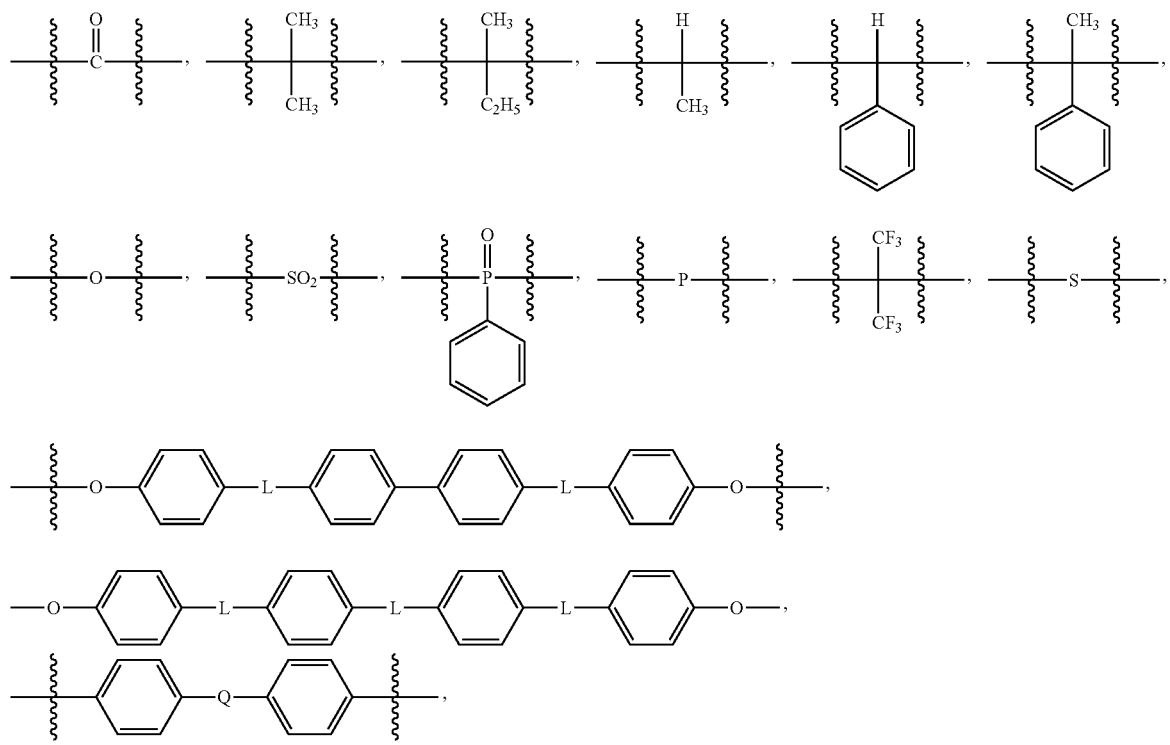

and combinations thereof. L may be —CH$_2$—, —(CH$_3$)$_2$C—, —O—, —S—, —SO$_2$—, —CO—, and combinations thereof. Q may be —S—, —SO$_2$— or —(CF$_3$)$_2$C—, —O—, —(CH$_3$)$_2$C—, and combinations thereof.

j is a positive integer, such as between about 1 and about 100, such as about 1 and about 10. m is a positive integer, such as between about 1 and about 1,000, such as about 1 and about 100. n is a positive integer, such as between about 1 and about 1,000, such as about 1 and about 10. p is a positive integer, such as between about 1 and about 1,000, such as about 1 and about 100. q is a positive integer, such as between about 1 and about 2,000, such as about 200 and about 1,000.

In some aspects, a ratio of m to n values of Formula (II) is between about 0.1:10 and about 10:0.1, such as about 1:1 and about 1:2. A ratio of m to p values of Formula (II) may be between about 0.1:10 and about 10:0.1, such as about 1:1 and about 1:2. A ratio of n to p values of Formula (II) may be between about 0.1:10 and about 10:0.1, such as about 1:1 and about 1:2. In some aspects, a ratio of

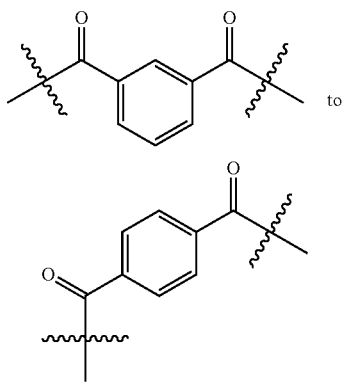

(for X and Y moieties of Formula (II)) is between about 0.1:10 and about 10:0.1, such as about 1:1 and about 1:2.

Figure 3:
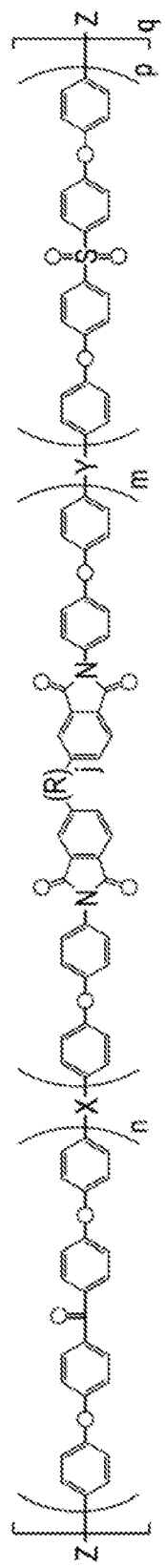
FIG. 3 illustrates chemical structures of general Formula (III).

FIG. 3 illustrates chemical structures of general Formula (III). As shown in FIG. 3, polymers of the present disclosure further include polymers of formula (III):

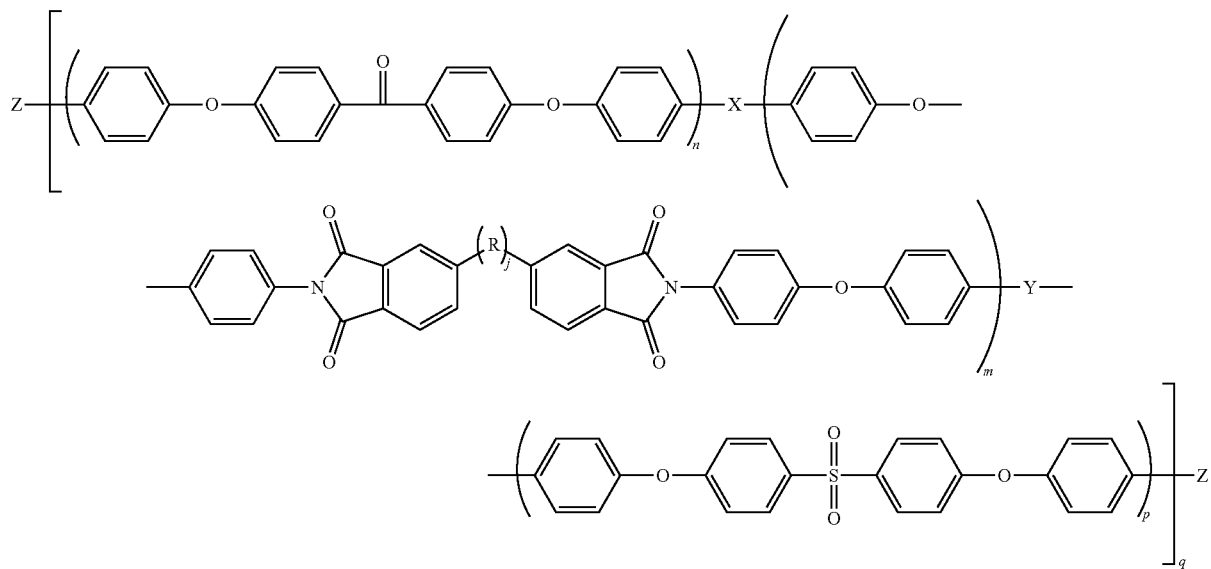
where X may be
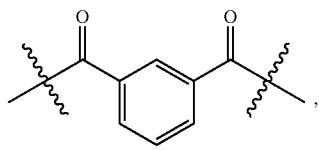
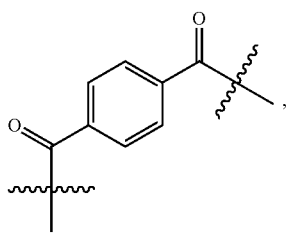
and combinations thereof. Y may be
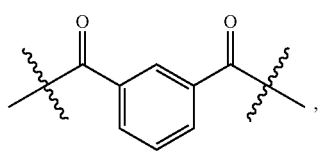
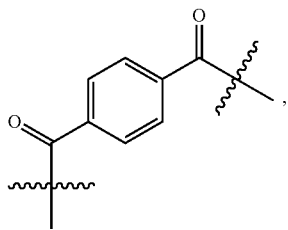
and combinations thereof. In some aspects, a ratio of
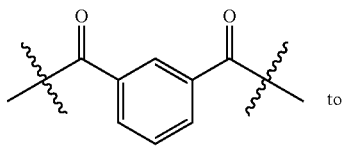
to
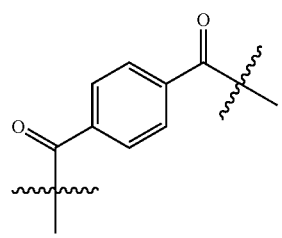
is between about 1:1 and about 1:2.
Z may be —H,
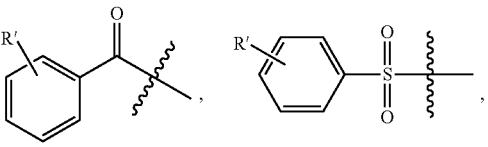
and combinations thereof, where R' is —H, halo, C1-C20 alkyl, cyano, or combinations thereof.

R may be selected from

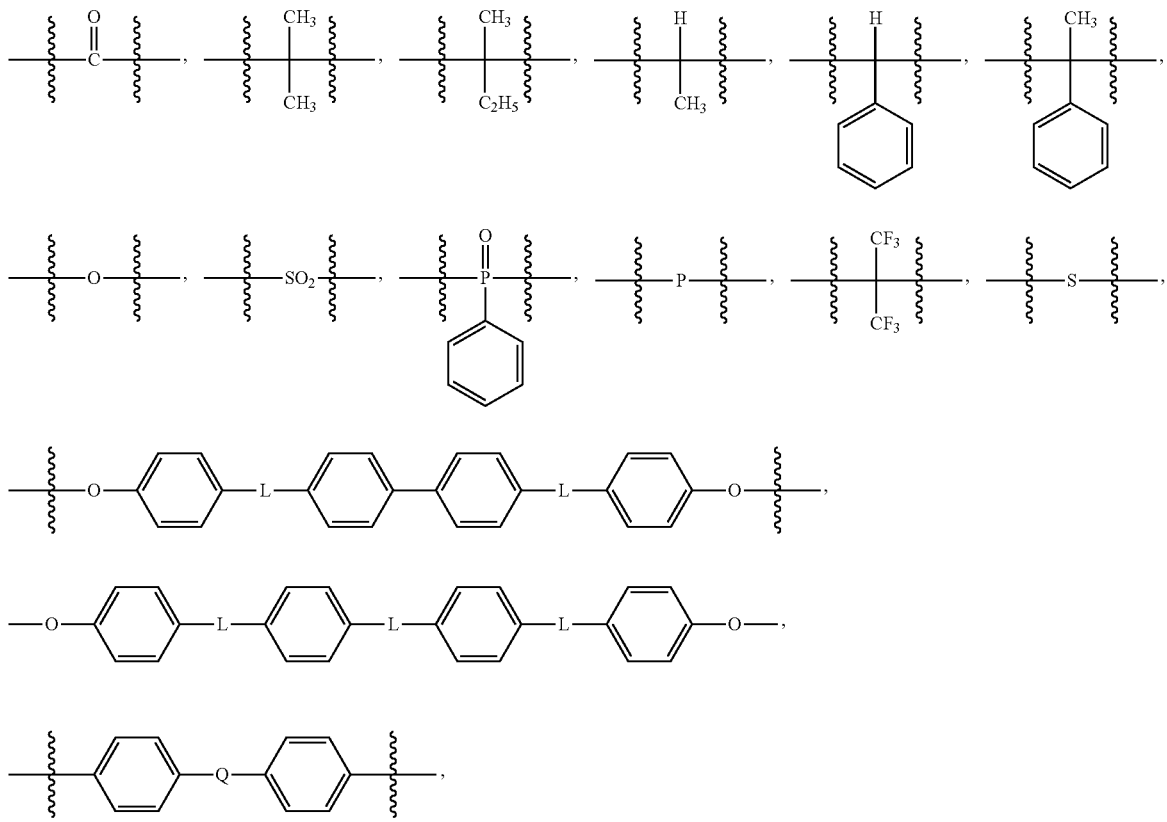

and combinations thereof. L may be —$CH_2$—, —$(CH_3)_2C$—, —O—, —S—, —$SO_2$—, —CO—, and combinations thereof. Q may be —S—, —$SO_2$— or —$(CF_3)_2C$—, —O—, —$(CH_3)_2C$—, and combinations thereof.

j is a positive integer, such as between about 1 and about 100, such as about 1 and about 10. m is a positive integer, such as between about 1 and about 1,000, such as about 1 and about 100. n is a positive integer, such as between about 1 and about 1,000, such as about 1 and about 100. p is a positive integer, such as between about 1 and about 1,000, such as about 1 and about 100. q is a positive integer, such as between about 1 and about 2,000, such as about 200 and about 1,000.

In some aspects, a ratio of m to n values of Formula (III) is between about 0.1:10 and about 10:0.1, such as about 1:1 and about 1:2. A ratio of m to p values of Formula (III) may be between about 0.1:10 and about 10:0.1, such as about 1:1 and about 1:2. A ratio of n to p values of Formula (III) may be between about 0.1:10 and about 10:0.1, such as about 1:1 and about 1:2. In some aspects, a ratio of

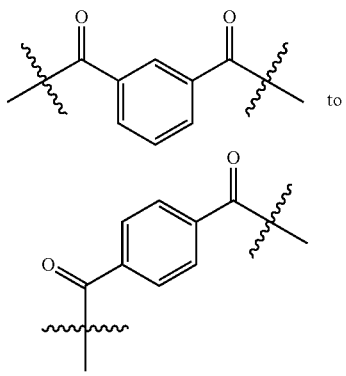

(for X and Y moieties of Formula (III)) is between about 0.1:10 and about 10:0.1, such as about 1:1 and about 1:2.

Figure 4:
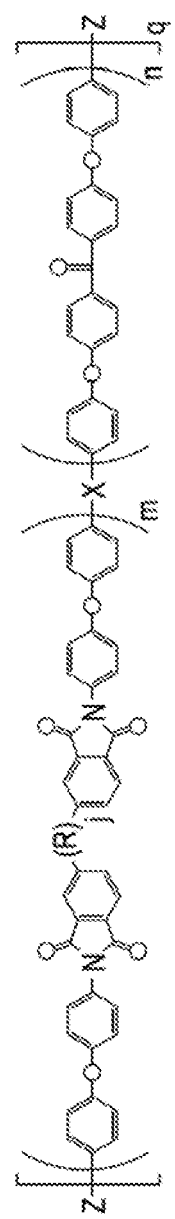
FIG. 4 illustrates chemical structures of general Formula (IV).

FIG. 4 illustrates chemical structures of general Formula (IV). As shown in FIG. 4, polymers of the present disclosure include polymers of formula (IV):

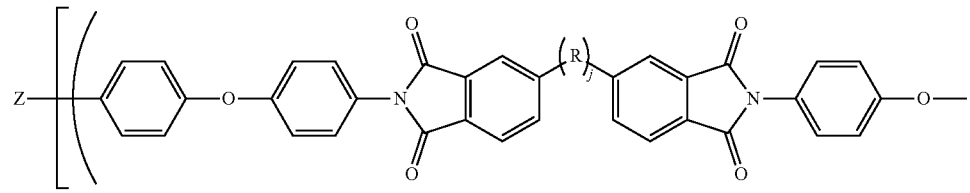

-continued
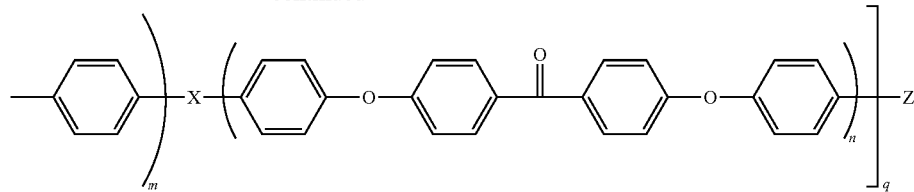
where X may be
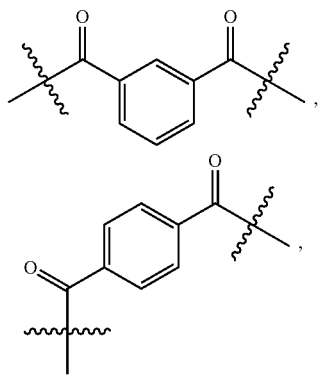
and combinations thereof. Z may be —H,
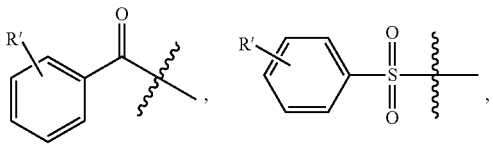
and combinations thereof, where R' is —H, halo, C1-C20 alkyl, cyano, or combinations thereof.
R may be
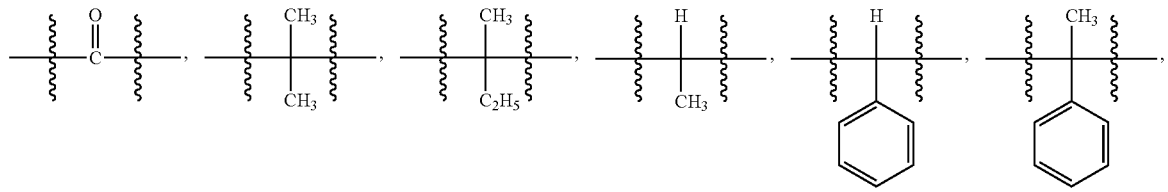
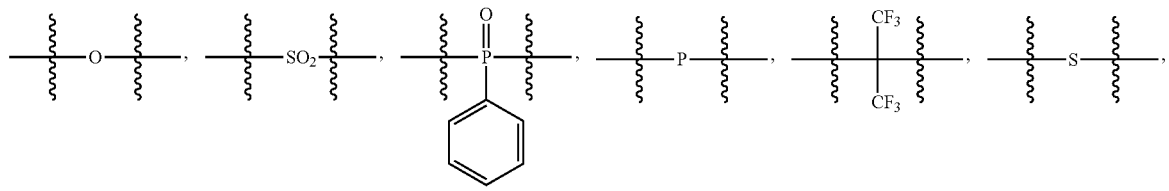
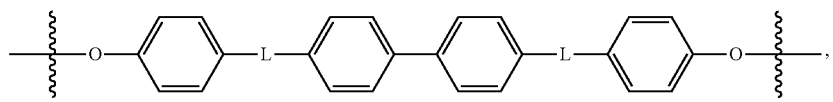
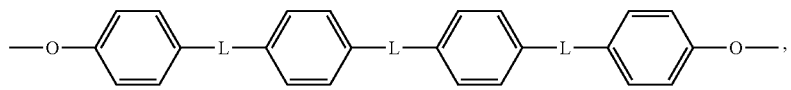
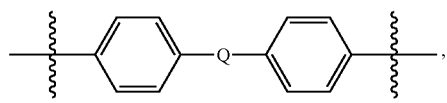
and combinations thereof.

L may be —CH$_2$—, —(CH$_3$)$_2$C—, —O—, —S—, —SO$_2$—, —CO—, and combinations thereof. Q may be —S—, —SO$_2$—, —SO$_2$—, —(CF$_3$)$_2$C—, —O—, —(CH$_3$)$_2$C—, and combinations thereof. j is a positive integer, such as between about 1 and about 100, such as about 1 and about 10. m is a positive integer such as between about 1 and about 1,000, such as about 1 and about 100. n is a positive integer such as between about 1 and about 1,000, such as about 1 and about 100. q is a positive integer such as between about 1 and about 1,000, such as about 1 and about 100. The molecular weight of the polymer of formula (IV) may be between about 10 kDa and about 150 kDa, such as about 50 kDa and about 120 kDa, such as about 80 kDa and about 100 kDa.

In some aspects, a ratio of m to n values of Formula (IV) is between about 0.1:10 and about 10:0.1, such as about 1:1 and about 1:2. In some aspects, a ratio of

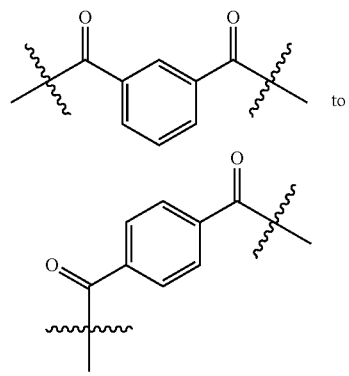

(for X moieties of Formula (IV)) is between about 0.1:10 and about 10:0.1, such as about 1:1 and about 1:2.

Polymer Syntheses

Polymers of the present disclosure, and synthesized from monomers described above, may be random copolymers or block copolymers.

Random Copolymers:

Synthetic approaches for random copolymers include (1) electrophilic syntheses, (2) nucleophilic syntheses, or (3) electrophilic gel syntheses. In some aspects, an electrophilic gel synthesis involves charging a reactor with about 788 g of aluminum chloride and about 50 mL dichloromethane, followed by cooling the mixture to −15° C. Next, about 200 g of EKE monomer is dissolved in 25 mL dichloromethane and added to the solution containing aluminum chloride to form a reaction mixture. Then, about 190 g of EIEIE monomer dissolved in 50 mL of dichloromethane is added to the reaction mixture. Next, about 160 g of TCP/ICP monomers in 25 mL dichloromethane is added to the reaction mixture. Then, about 20 g of benzoyl chloride in 10 mL dichloromethane is added to the bulk reaction mixture, and the mixture is allowed to warm to about 10° C. and stirred for about 4.5 hours while maintaining temperature at 10° C. The reaction mixture may then be washed using any suitable washing process, for example a hydrochloric acid wash. However, a gel process results in a gel having large amounts of hydrochloric acid, which leads to difficulties in scalability. Furthermore, reaction temperatures of electrophilic syntheses are typically lower than temperatures involving nucleophilic reactions, making electrophilic syntheses more amenable to scale up.

Electrophilic syntheses may include Friedel Crafts synthesis in which an aryl ketone linkage is formed from a carboxylic acid halide and an aromatic compound having an activated hydrogen, i.e., a hydrogen atom displaceable under the electrophilic reaction conditions. The monomer system employed in the reaction can be, for example, (a) a single aromatic compound containing a carboxylic acid halide (e.g., a capping agent) as well as an aromatic carbon bearing a hydrogen activated towards electrophilic substitution (e.g., EKE, EIEIE, or ESE); or (b) a two-monomer system of a dicarboxylic acid dihalide (e.g., TCP or ICP) and an aromatic compound containing two such activated hydrogens (e.g., EKE, EIEIE, or ESE). A reaction mixture for such Friedel Crafts reactions includes the monomers, a catalyst, such as anhydrous aluminum chloride, and an inert solvent such as methylene chloride.

In some aspects, copolymers of the present disclosure (both random and block copolymers) are synthesized by Friedel Crafts reactions where reaction conditions generally include adding TCP/ICP, EKE, ESE, and EIEIE to a reactor with o-dichlorobenzene, dichloromethane, and/or dichloroethane as a solvent. The solution may be cooled to about −10° C., and aluminum chloride added slowly over about 30 minutes. Following addition of the aluminum chloride, the reaction mixture may be allowed to warm to about 10° C., held at 10° C. for about 10 minutes, and re-cooled to −10° C. Additional TCP/ICP may then be added. Preheated solvent (for example, o-dichlorobenzene between about 160° C. and about 190° C.) may then be added to the reaction mixture, and the reaction mixture may be held at 100° C. for at least about 30 minutes. In some aspects, the reaction mixture is then decomplexed using, for example, ice water. For every 1 kg of polymer, at least about 3 kg of water may be used to rinse and neutralize the hydrochloric acid. The sample is then dried. An additional 8 liters (L) of water (per 1 kg polymer) is then added to the sample and heated to about 95° C. while stirring. Water is then removed (e.g., by distillation). An additional 8 liters (L) of water (per 1 kg polymer) is then added to the sample and again heated to about 95° C. while stirring. Water is then decanted. 8 L of water (per 1 kg polymer) and 200 mL of NH3 (per 1 kg polymer) is then added to the sample and heated to about 95° C. while stirring. Water is then removed. 8 L of deionized water is then added to the sample and heated to about 95° C. while stirring. The sample is then dried at about 120° C. for about 24 hours.

In some aspects, the temperature at which a Friedel Crafts reaction is conducted is between about −50° C. and about 160° C. The reaction may commence at lower temperatures, for example between about −50° C. and about −10° C. The temperature may then be raised if desired, up to about 160° C. or even higher, for example, to promote the reaction to substantial completion. In some aspects, a Friedel Crafts reaction is performed at temperatures in the range of between about −30° C. and 25° C. (e.g., room temperature).

In some aspects, one or more capping agents are added to a reaction mixture to cap the polymer on at least one end of the polymer backbone. Capping agents promote termination of continued growth of a polymer chain and control the resulting molecular weight of the polymer, as shown by the inherent viscosity of the polymer. Judicious use of the capping agents results in a polymer within a controlled molecular weight range, decreases gel formation during polymerization, decreases branching of the polymer chains, and increases melt stability. Molecular weights of polymers of the present disclosure are balanced to provide good mechanical properties while providing rheological properties that promote chain mobility close to the polymer glass transition temperatures.

In some aspects, capping agents are compounds of the formula:

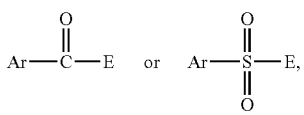

where "Ar" includes phenyl or an aromatic group substituted with C1-C20 alkyl and/or an electron withdrawing substituent such as halo or cyano, and E is halogen or other leaving group. Some exemplary capping agents include benzoyl chloride, benzenesulfonyl chloride, 3-chlorophenyl, 4-chlorophenyl, 4-cyanophenyl, 4-methylphenyl.

Decomplexation of the polymer from the aluminum chloride catalyst can be accomplished by treating the reaction mixture with a decomplexing base after completion of polymerization. The base can be added to the reaction medium or the reaction medium can be added to the base. The decomplexing base may be at least as basic towards the Lewis acid (aluminum chloride) as the basic groups on the polymer chain. Such decomplexation may be performed before isolation of the polymer from the reaction mixture.

The amount of decomplexing base used may be in excess of the total amount of bound (complexed) and unbound Lewis acid present in the reaction mixture and may be twice the total amount of Lewis acid. Decomplexing bases include water, dilute aqueous hydrochloric acid, methanol, ethanol, acetone, N,N-dimethyl-formamide, N,N-dimethylacetamide, pyridine, dimethyl ether, diethyl ether, tetrahydrofuran, trimethylamine, trimethylamine hydrochloride, dimethyl sulfide, tetramethylenesulfone, benzophenone, tetramethylammonium chloride, isopropanol and the like. The decomplexed polymer can then be removed by adding a nonsolvent for the polymer which is a solvent for or miscible with the Lewis acid/Lewis base complex and the Lewis acid; spraying the reaction mixture into a non-solvent for the polymer; separating the polymer by filtration; or evaporating the volatiles from the reaction mixture and then washing with an appropriate solvent to remove any remaining base/catalyst complex and diluent from the polymer.

Example of High Molecular Weight EIEIE+EKE+ESE Random Copolymer Synthesis:

2 L of cooled (e.g., −20° C.) dichloromethane (DCM) is added to a reactor. Aluminum chloride (approx. 500 g) is dissolved in about 50 mL of additional chilled DCM. EKE monomer (about 150 g) is dissolved in about 25 mL of chilled DCM. Dimethyl sulfone (about 100 g) is dissolved in about 25 mL of DCM and chilled. EIEIE (approx. 100 g) and ESE (approx. 100 g) monomers is dissolved in DCM, chilled to, for example, −20° C., and added to the reactor. Terephthaloyl chloride and/or isophthaloyl chloride are dissolved in DCM, chilled, and added to the reactor. The temperature of the reaction mixture is increased slowly to about 20° C. over a period of 4.5 hours and stirred continuously. A molar excess of end cap, such as benzoyl chloride, is then added and stirring is continued at 20° C. for an additional 30 minutes. The reaction is then quenched by adding 1 liter of methanol chilled to about −40° C. Stirring is continued for about an hour. The polymer is filtered and rewashed twice with one liter of methanol. The polymer is transferred to a beaker and boiled in one liter of water until the liquid temperature is about 98° C. After filtration, the polymer is soaked in about 500 g glacial formic acid for about 30 minutes, filtered and dried overnight in a vacuum oven at about 170° C. with a light nitrogen bleed.

Example of High Molecular Weight EIEIE+EKE Random Copolymer Synthesis:

2 L of cooled (e.g., −20° C.) dichloromethane (DCM) is added to a reactor. Aluminum chloride (about 500 g) is dissolved in about 50 mL of additional chilled dichloromethane. EKE monomer (about 150 g) is dissolved in about 25 mL of chilled DCM. Dimethyl sulfone (about 100 g) is dissolved in about 25 mL of DCM and chilled. EIEIE (about 100 g) monomer is dissolved in DCM, chilled to, for example, −20° C., and added to the reactor. Terephthaloyl chloride and/or isophthaloyl chloride are dissolved in DCM, chilled, and added to the reactor. The temperature of the reaction mixture is increased slowly to about 20° C. over a period of 4.5 hours and stirred continuously. A molar excess of end cap, such as benzoyl chloride, is then added and stirring is continued at 20° C. for an additional 30 minutes. The reaction is then quenched by adding 1 liter of methanol chilled to about −40° C. Stirring is continued for about an hour. The polymer is filtered and rewashed twice with one liter of methanol. The polymer is transferred to a beaker and boiled in one liter of water until the liquid temperature is about 98° C. After filtration, the polymer is soaked in about 500 g glacial formic acid for about 30 minutes, filtered and dried overnight in a vacuum oven at about 170° C. with a light nitrogen bleed.

Block Copolymers:

Block copolymers may be synthesized by: (1) sequential monomer addition or (2) macro-initiator methods. Specifically, sequential monomer addition may involve a Friedel Crafts reaction, similar to that described above for random copolymer synthesis. However, reaction conditions of a Friedel Crafts reaction for polymer synthesis (as described above) may be adjusted, e.g. order of addition of reagents, such that a block copolymer is formed instead of a random copolymer.

In addition, providing to a reaction mixture (1) ratios or sequential addition of ICP and TCP and/or (2) ratios or sequential addition of EKE/EIEIE/ESE or EKE/EIEIE for syntheses of random and block copolymers of the present disclosure provides control of the crystallinity of the copolymer, e.g. tailoring amorphous and crystalline blocks of a block copolymer. Thus, sequential monomer addition of (1) TCP or ICP and/or (2) EKE/EIEIE/ESE will promote block copolymers with controlled formation of crystalline or semicrystalline blocks and amorphous blocks. As indicated in the general description above of Formulae (I), (II), (III), and (IV), a particular ratio of EKE/EIEIE/ESE or EKE/EIEIE monomers of a copolymer synthesis affects, for example, integer values of n, m, and p of Formulae (I), (II), (III), and (IV), and a particular ratio of ICP/TCP monomers of a copolymer synthesis affects the identity and quantity of X and Y of Formulae (I), (II), (III), and (IV).

Example of High Molecular Weight EIEIE+EKE+ESE Block Copolymer:

2 L of cooled (e.g., −20° C.) dichloromethane (DCM) is added to a reactor. Aluminum chloride (about 500 g) is dissolved in about 50 mL of additional chilled dichloromethane. A molar excess of EKE is dissolved in about 25 mL of DCM and chilled to, for example, −20° C. The molar excess of EKE ensures that the polymers formed in the first phase of this synthesis are low molecular weight polymers. The high molecular weight polymers are achieved by the end of the overall synthesis. Dimethyl sulfone is dissolved in DCM, chilled, and added to the reactor. EIEIE monomer is dissolved in DCM, chilled, and added to the reactor. Terephthaloyl chloride and/or isophthaloyl chloride are dissolved in DCM, chilled, and added to the reactor. The temperature of the reaction mixture is then increased to about 20° C. slowly over a period of about 2 hours and stirred continuously. The reaction mixture is then cooled to about −20° C. Additional EKE monomer is dissolved in DCM, chilled, and added to the reactor. Additional ESE monomer is also dissolved in DCM, chilled, and added to the reactor. Terephthaloyl chloride and/or isophthaloyl chloride are dissolved in DCM, chilled, and added to the reactor. The temperature of the reaction mixture is increased to about 20° C. slowly over a period of 4.5 hours and stirred continuously. A molar excess of end capper, such as benzoyl chloride, is then added to the reaction mixture and stirring is continued at about 20° C. for an additional about 30 minutes. The reaction is then quenched by adding 1 liter of methanol chilled to about −40° C. Stirring is continued for about an hour. The polymer is filtered and rewashed twice with one liter of methanol. The polymer is transferred to a beaker and boiled in one liter of water until the liquid temperature is about 98° C. After filtration, the polymer is soaked in about 500 g glacial formic acid for about 30 minutes, filtered and dried overnight in a vacuum oven at about 170° C. with a light nitrogen bleed.

Example of High Molecular Weight EIEIE+EKE Block Copolymer:

2 L of cooled (e.g., −20° C.) dichloromethane (DCM) is added to a reactor. Aluminum chloride (about 500 g) is dissolved in about 50 mL of additional dichloromethane and chilled. A molar excess of EKE is dissolved in about 25 mL of DCM and chilled to, for example, −20° C. The molar excess of EKE ensures that the polymers formed in the first phase of this synthesis are low molecular weight polymers. The high molecular weight polymers are achieved by the end of the overall synthesis. Dimethyl sulfone is dissolved in DCM, chilled, and added to the reactor. EIEIE monomer is dissolved in DCM, chilled, and added to the reactor. Terephthaloyl chloride and/or isophthaloyl chloride are dissolved in DCM, chilled, and added to the reactor. The temperature of the reaction mixture is then increased to about 20° C. slowly over a period of about 2 hours and stirred continuously. The reaction mixture is then cooled to about −20° C. Additional EKE monomer is dissolved in DCM, chilled, and added to the reactor. Additional EIEIE monomer is also dissolved in DCM, chilled, and added to the reactor. Terephthaloyl chloride and/or isophthaloyl chloride are dissolved in DCM, chilled, and added to the reactor. The temperature of the reaction mixture is increased to about 20° C. slowly over a period of 4.5 hours and stirred continuously. A molar excess of end capper, such as benzoyl chloride, is then added to the reaction mixture and stirring is continued at about 20° C. for an additional about 30 minutes. _The reaction is then quenched by adding 1 liter of methanol chilled to about −40° C. Stirring is continued for about an hour. The polymer is filtered and rewashed twice with one liter of methanol. The polymer is transferred to a beaker and boiled in one liter of water until the liquid temperature is about 98° C. After filtration, the polymer is soaked in about 500 g glacial formic acid for about 30 minutes, filtered and dried overnight in a vacuum oven at about 170° C. with a light nitrogen bleed.

Polymer Applications

Non-limiting examples for uses of block copolymers and random copolymers of the present disclosure include uses as thermoplastic adhesives and as a component of prepreg material. For prepreg material, polymers of the present disclosure may be applied onto and/or impregnated into fiber materials composed of graphite, fiberglass, nylon, Kevlar® and related materials (for example, other aramid polymers), spectra, among others.

High molecular weight block copolymers and random copolymers of the present disclosure, such as copolymers of Formulae (I), (II), (III), and (IV), have superior physical and chemical properties as compared to existing thermoplastic polymer adhesives and prepreg polymers. For example, in some aspects, copolymers of Formulae (I), (II), (III), and (IV) undergo processing at temperatures of about 355° C. or 385° C. without polymer degradation. Furthermore, in some aspects, copolymers of Formulae (I), (II), (III), and (IV) have glass transition temperatures below about 190° C. for joining thermoset applications without degrading the thermoset component. In addition, copolymers of Formulae (I), (II), (III), and (IV) may be at least partially amorphous so that crystal formations do not inhibit molecular diffusion at a film to film interface. Copolymers of Formulae (I), (II), (III), and (IV) may also have environmental/chemical resistance equal to or better than base structures (i.e., vehicle components and, if present, other typical layers on the components). Furthermore, syntheses of the present disclosure for copolymers of Formulae (I), (II), (III), and (IV) allow copolymer molecular weights that are high molecular weights, but are nonetheless balanced to provide good mechanical properties while providing rheological properties that promote chain mobility close to the glass transition temperatures. Furthermore, the high molecular weights of copolymers of Formulae (I), (II), (III), and (IV) promote adhesion ability with vehicle surfaces utilizing physical interactions with the surface, instead of chemical reactions with the surface which is typical for existing low molecular weight polymers.

Diffusion Bonded Adhesive that is a Random Copolymer:

Amorphous thermoplastic films (e.g., a composition comprising one or more polymers of the present disclosure) may be used to join thermoplastics to thermoplastics and thermoplastics to thermosets. The film should be thermally stable at processing temperatures greater than 355° C. and compatible with epoxies. An adherend (to which the film is applied) may be a thermoset composite, thermoplastic composite, or a metal substrate.

Figure 5:
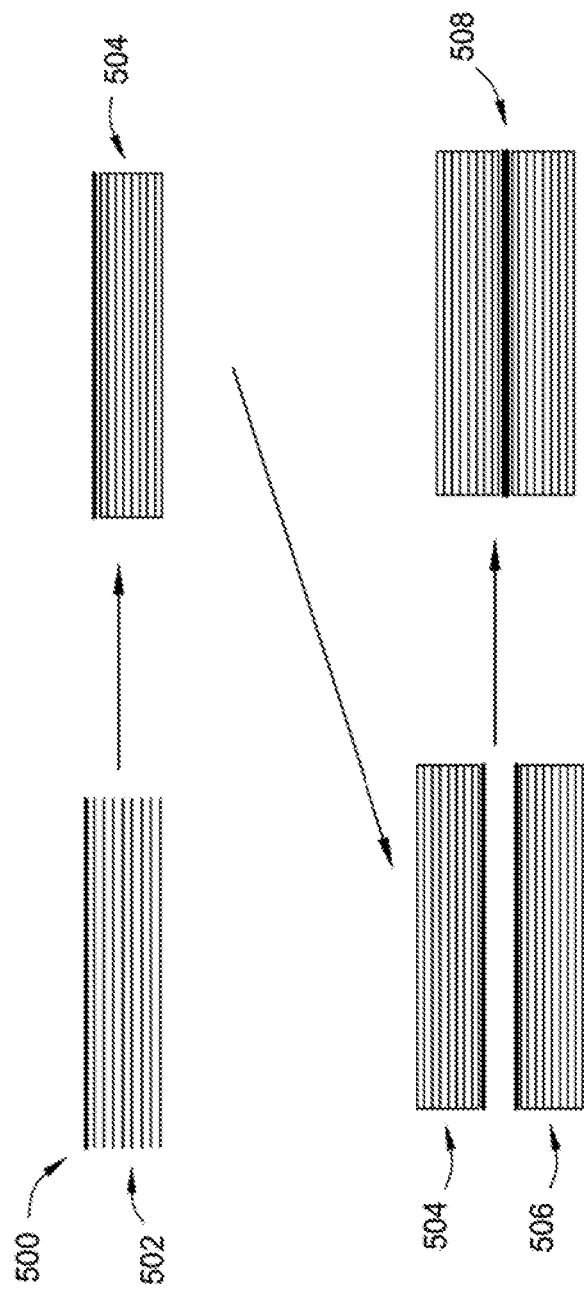
FIG. 5 is a schematic illustration of film consolidation on an adherend.

FIG. 5 is a schematic illustration of film consolidation on an adherend. As shown in FIG. 5, stack 500 contains sheets 502 of thermoplastic prepreg. The sheets are not consolidated. Applying high heat (such as 355° C.-385° C.) and pressure promotes consolidation of the stack to form consolidated thermoplastic composite 504. Temperatures and pressures for consolidating known thermoplastic polymers degrade the polymers impregnated within and onto a prepreg. However, high molecular weight polymers of the present disclosure, such as polymers of Formulae (I), (II), (III), and (IV), provide temperature resistance at the typical processing temperatures.

Also shown in FIG. 5, consolidated thermoplastic prepreg 504 can be joined with a companion thermoplastic composite 506 using heat and pressure. The two or more thermoplastic prepregs may be already consolidated (e.g., consolidated thermoplastic prepreg 504) before joining of the two films. A random copolymer of Formulae (I), (II), (III), and/or (IV) is placed on a surface of consolidated thermoplastic prepreg 504 and/or a surface of companion thermoplastic composite 506. The surfaces are mated together by heating the structure with pressure, forming a bonded prepreg stack 508. High molecular weight polymers of the present disclosure are useful for these purposes because the high molecular weight copolymers of Formulae (I), (II), (III), and/or (IV) promote adhesion without detrimentally high viscosity upon heating and increased pressure. In general, polymer viscosity becomes unworkable if the molecular weight of a polymer becomes too large, further highlighting an advantage of copolymers having high molecular weights that are balanced. Also, high molecular weight copolymers of Formulae (I), (II), (III), and/or (IV) utilize physical interactions with an adjacent surface to promote adhesion of adjacent surfaces, as opposed to chemical reactions with adjacent surfaces which is typical for known low molecular weight polymers.

In some aspects, one or both of the thermoplastic prepregs may be consolidated simultaneously upon a film joining (a "co-consolidation")(e.g, thermoplastic prepreg 504 and companion thermoplastic composite 506 are not yet consolidated upon film joining). Thus, the film joining process may also be a consolidation process.

Figure 6:
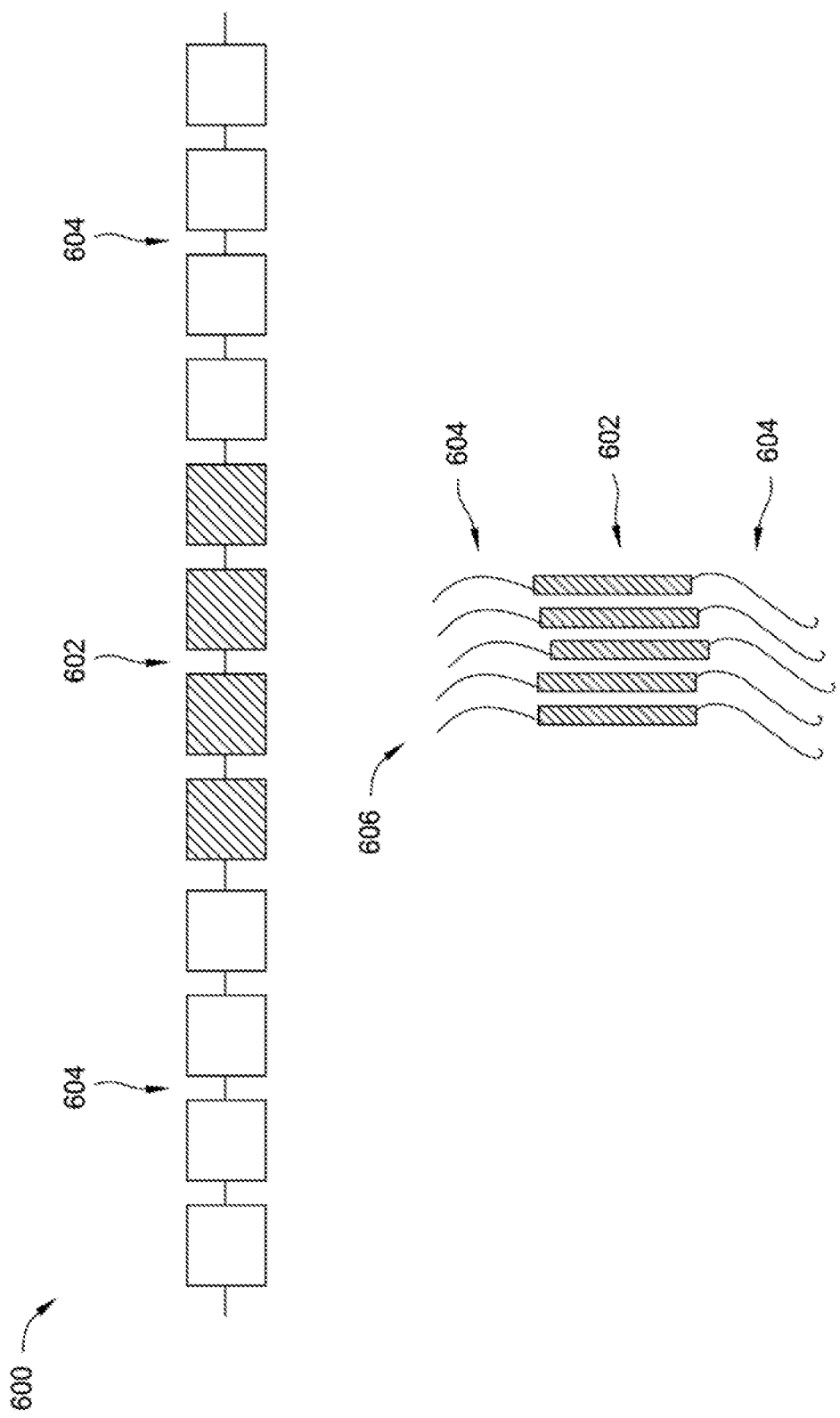
FIG. 6 is a schematic of a block copolymer and copolymer block-block interactions.

Diffusion Bonded Adhesive that is a Block Copolymer:

Adhesion processes for block copolymers of the present disclosure are the same as those with random copolymers, e.g. as shown in FIG. 5. However, in some aspects, the adhesion ability of a block copolymer may be stronger than the adhesion ability of a corresponding random copolymer because the block copolymer provides a core block that is relatively crystalline and one or more adjacent blocks that are amorphous. FIG. 6 is a schematic of a block copolymer and copolymer block-block interactions. As shown in FIG. 6, a block copolymer 600 has a crystalline core (block) 602 and amorphous arms (blocks) 604. Crystalline core 602 may be, for example, EIEIE monomeric units connected by TCP or ICP linkers, while amorphous arms 604 may be, for example, EKE monomeric units connected by TCP or ICP linkers. After processing, crystalline blocks of the block copolymer may be physically entangled with each other, such that there are now two types of physical cross sections for polymer-polymer interactions: one type that is crystalline-crystalline block interactions and one type that is amorphous-amorphous block interactions. For example, different molecules of block copolymer 600 may form a copolymer aggregate 606, promoted by crystalline-crystalline block interactions of crystalline core 602 of molecules of block copolymer 600. The crystalline-crystalline block interactions are high strength interactions. Furthermore, the one or more amorphous blocks adjacent to a crystalline core provide a block copolymer that is at least partially amorphous so that crystal formations do not inhibit molecular diffusion at a film to film interface, such as the interface of consolidated thermoplastic prepreg 504 and companion thermoplastic composite 506 of FIG. 5.

Example Copolymers

Examples (as used herein, "% OOB" denotes the percent out of balance stoichiometry (ether/imide or ether/sulfone is in excess)). Target glass transition temperatures (Tg) are greater than about 135° C. and target melting temperatures are less than about 355° C.

| Example | EIEIE (mol %) | EKE (mol %) | ESE (mol %) | TCP (mol %) | ICP (mol %) | Benzoyl Chloride End Cap (mol %) | % OOB | Tg (° C.) | Viscosity @ 380° C. (Pa × S) | ΔH$_c$ (J/g) |
|---|---|---|---|---|---|---|---|---|---|---|
| 1 (High MW) | 24.45 | 28.06 | 0 | 24.74 | 27.74 |  | 2 | 178 | 1840 |  |
| 2 (Low MW) | 22.61 | 28.26 | 0 | 24.56 | 24.56 |  | 3.5 | 174 | 165 |  |
| 3$^a$ | 16.92 | 32.01 | 0 | 45.58 | 0 | 5.48 |  | 169 |  | 29.8 |
| 4 (Low MW) | 53.20 | 28.35 | 0 | 24.23 | 24.23 |  | 6 | 186 | 448 |  |
| 5 (High MW) | 23.44 | 28.65 | 0 | 23.96 | 23.96 |  | 8 | 187 | 1660 |  |
| 6 (High MW) | 15 | 20 | 15 | 45 | 0 | 5 |  | 182 |  |  | a: Tg = 169° C. Tm = 212° C.

The polymers of Example 1 and Example 2 may be amorphous. Example 1 is a copolymer with a significantly lower Tg value (approx. 40° C.) than PEKK, polyether imide (PEI), and polyethersulfone (PES), but maintains similar mechanical properties, has excellent thermal stability, and has equivalent or improved miscibility with PEKK.

A small subset of three coupons was made for Example 1 and Example 2 in the continuous compression molding (CCM) process and the autoclave at 375° C. for 1 hour at 100 psi. The coupons were fabricated with polymer (Example 1 or Example 2) as a film that was converted from reactor flake in a press.

Figure 7:
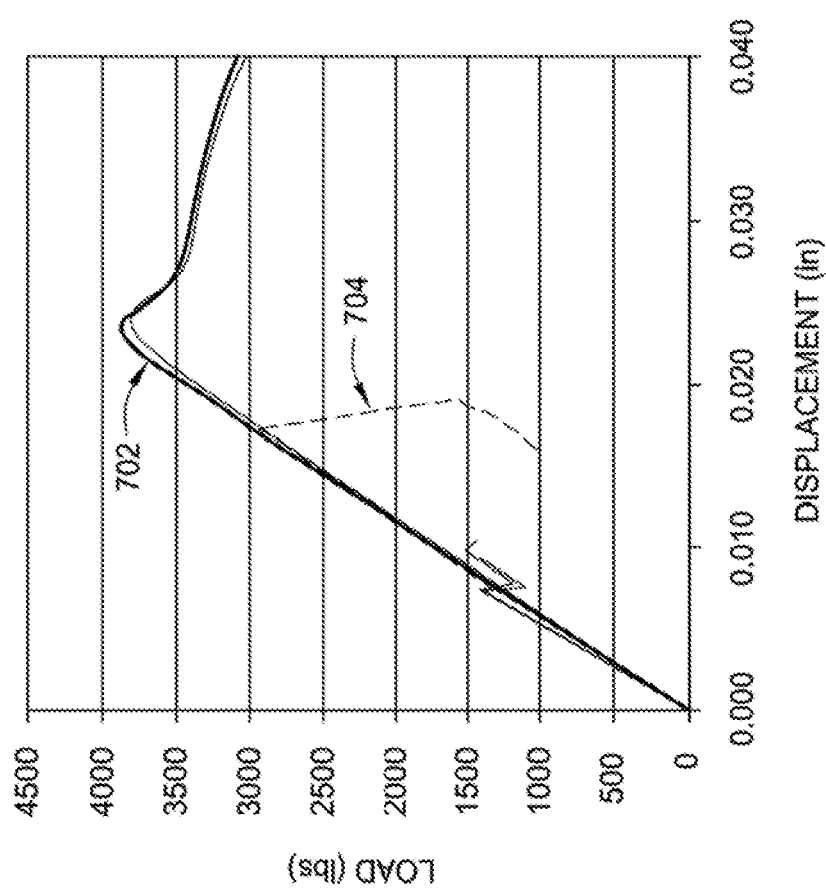
FIG. 7 is a graph illustrating load displacement curves of lap shear testing of test coupons having the copolymers of Example 1 or Example 2.

A continuous compression molding process was used to flatten the film (Example 1 or Example 2) to a uniform thickness onto co-consolidated adherends. FIG. 7 is a graph illustrating load displacement curves of lap shear testing of test coupons including the copolymers of Example 1 or Example 2. Lap shear strengths were measured from 0.5 square inch laps. As shown in FIG. 7, lap shear strength of Example 1 (line 702) is 7.1+/−1 thousands of pounds per square inch (ksi), while lap shear strength of Example 2 (line 704) is 3.0+/−0.2 ksi, illustrating an advantage of high molecular weight copolymers of the present disclosure.

Furthermore, comparison of failure modes between test coupons including Example 1 and Example 2 show first ply failure (predominantly fiber tear failure) for test coupons including Example 1, but adhesive failure between film-to-film layers for test coupons including Example 2.

The results of the lap shear tests are favorable for Example 1, the higher molecular weight version of the co-polymer. In this case, polymer chain length of Example 2 was too small showing a failure between the two films (Example 2 had the lower viscosity at 380° C.).

Figure 8:
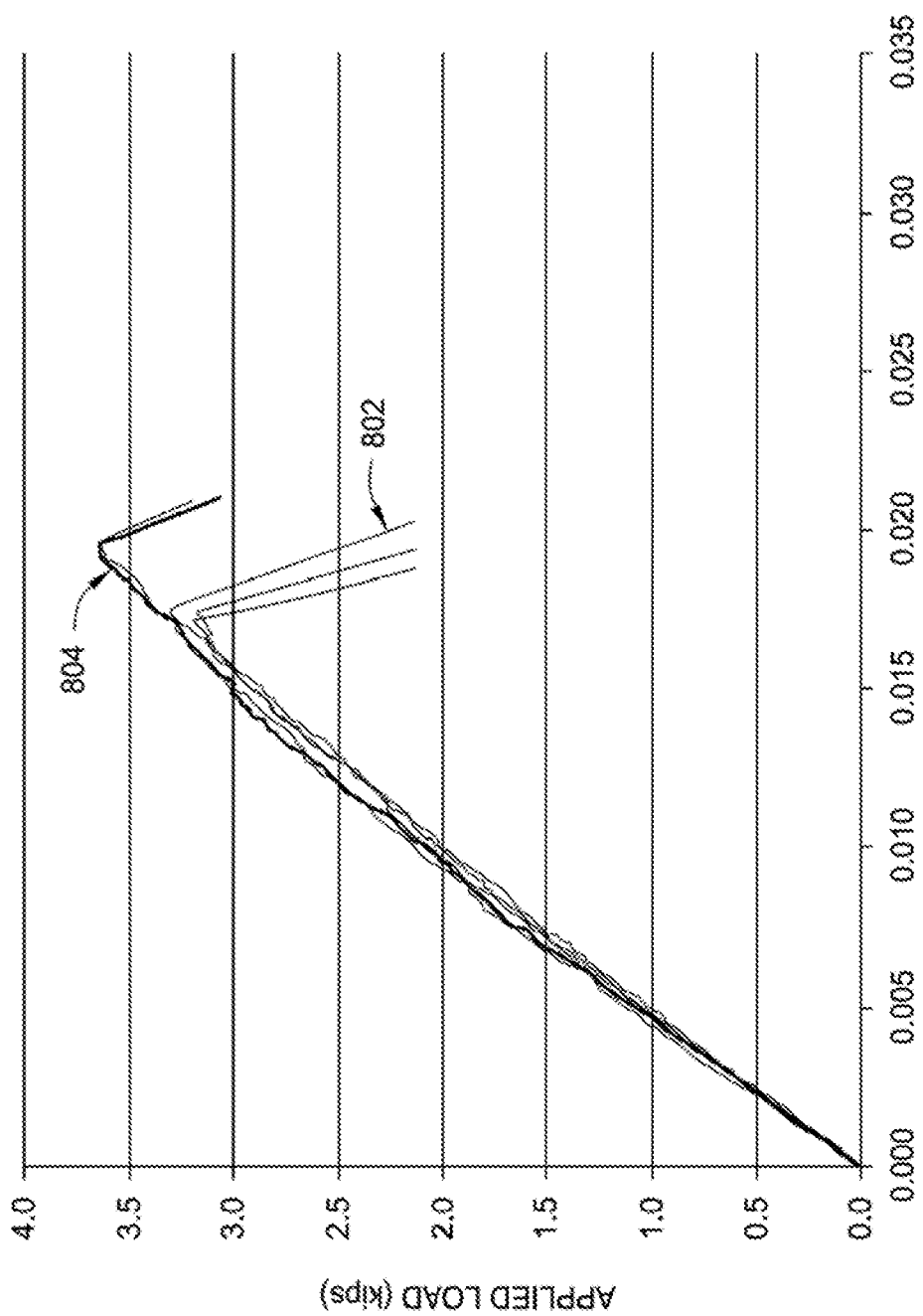
FIG. 8 is a graph illustrating load displacement curves of lap shear testing of test coupons having the copolymers of Example 4 or Example 5.

Example 4 and Example 5 were fabricated in the same manner as Example 1 and Example 2, but were joined in the autoclave at 190° C. due to their slightly higher glass transition temperatures. FIG. 8 is a graph illustrating load displacement curves of lap shear testing of test coupons including the copolymers of Example 4 or Example 5. Lap shear strengths were measured from 0.5 square inch laps. As shown in FIG. 8, lap shear strength of Example 4 (line 802) is 7.0+/−0.7 ksi, while lap shear strength of Example 5 (line 804) is 7.2+/−0.5 ksi.

Again, the higher molecular weight version (Example 5) provided better performance over a lower molecular weight. However, only a small difference was observed in failure modes of Example 4 and Example 5, as both examples have first ply failure in adherends. Shear strength of imide-based co-polymers of the present disclosure are the highest recorded in comparison to known films including pseudo amorphous PEKK-DS and PES.

Figure 9:
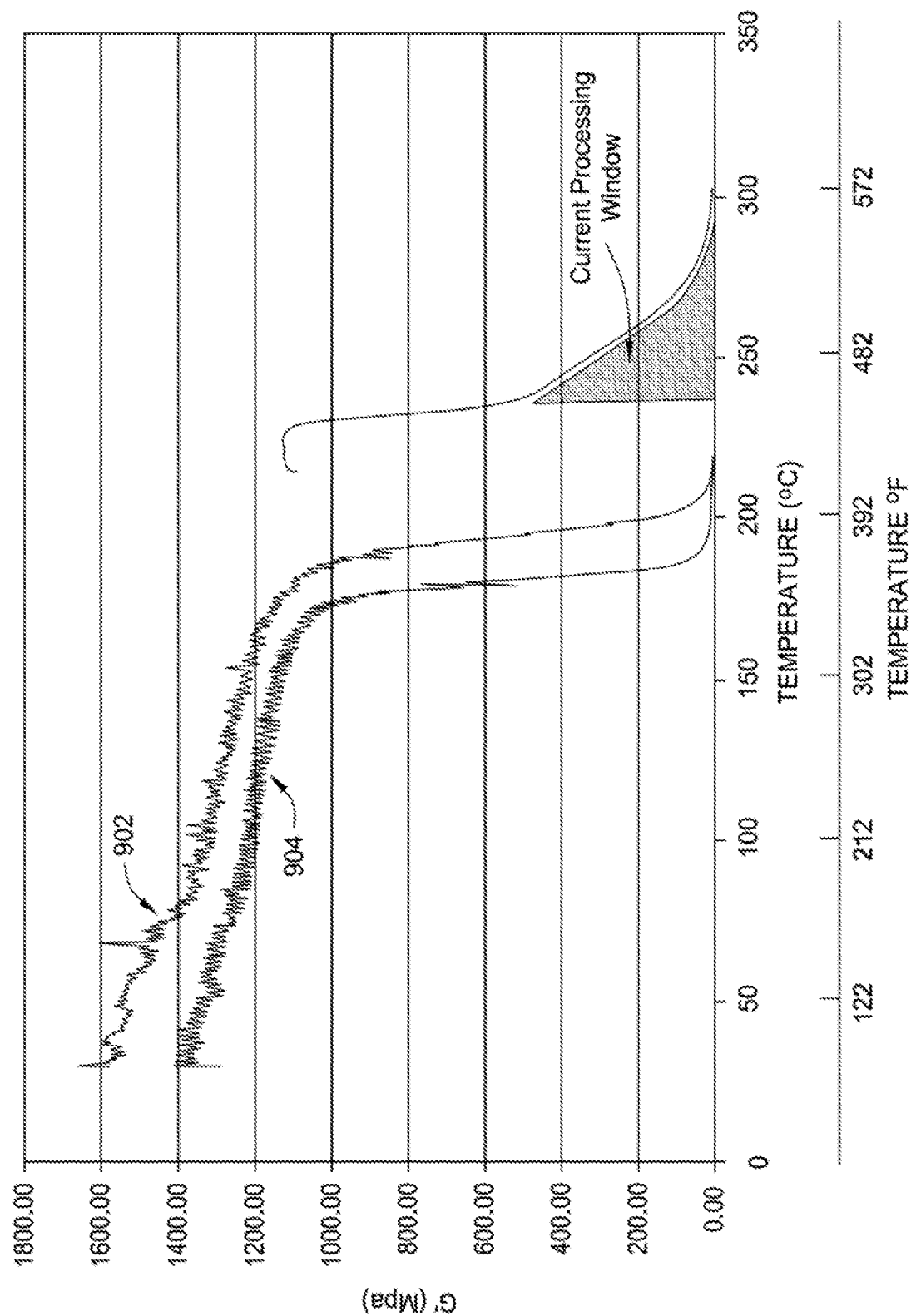
FIG. 9 is a graph illustrating storage moduli versus processing temperatures of Example 1 and Example 5.

FIG. 9 is a graph illustrating storage moduli versus processing temperatures of Example 1 and Example 4. As shown in FIG. 9, Example 1 (line 902) and Example 4 (line 904) each have a storage modulus (G') in gigaPascals (GPa) that drastically declines at temperatures above 175° C., such as about 190° C. Thus, a temperature of about 190° C. is obtained for film joining with common thermoset matrix composites, and provides a significantly lower processing temperature window as compared to known film joining processes. (Example 5 gave very similar data as Example 4).

High molecular weight copolymers of the present disclosure provide improved lap shear strength but are of sufficiently low molecular weight such that a joining temperature far away, e.g. 75° C., from the polymers' glass transition temperatures does not result.

Overall, polymers of the present disclosure, high molecular weight copolymers, may be used as an adhesive. These polymers provide greater adhesion strength than existing polymers. Without being bound by theory, polymers of the present disclosure allow improved adhesion to surfaces due, at least in part, to the increased energy required to promote cohesive removal. Physical entanglement of the polymer adhesive with the polymers/material of the substrate does not require chemical reaction of the polymers with the substrate, unlike known low molecular weight polymers. In some examples, polymers of the present disclosure are compatible with epoxies, providing bonding to a thermoset. Polymers of the present disclosure provide a high use temperature, but low processing temperature. High use temperature provides for use of the polymers on components of a vehicle/aircraft. Another application of polymers of the present disclosure may be as an adhesive as a diffusion bonded film with a lower processing temperature than typical thermoplastic and thermoset composites. This allows for joining of composite parts with the use of fewer or no fasteners.

From an assembly perspective, there are multiple benefits with regard to the use of polymers of the present disclosure. For example, the complexity of assembly tooling is improved. In some aspects, polymers of the present disclosure have very low flow at elevated temperatures so it is not necessary for a tool to encapsulate the resin, which opens up the range of tooling materials that can be used for a co-bond or post-bond process. An elastomeric material can be used to fill tool gaps and allow some buffer for thermal expansion during a cycle. Thus, a tool with more generous tolerances is provided, which significantly reduces tooling and machining costs. In some aspects, the tooling cost to produce a typical flight control surface with this method would be in the $30,000 to $50,000 range compared to $500,000 to $1,000,000 for a similar thermoset co-cure tool. Furthermore, in some aspects, adherends do not require extensive surface preparation that is typically required for adhesive bonding. A simple solvent wipe may be sufficient to obtain a sufficient joint since melt fusing two polymers of material does not require certain functional groups (i.e., physical bonding instead of chemical bonding) nor is it sensitive to surface energies for wet-out. This substantially or completely eliminates the need for plasma treating or mechanical abrasion processes, which adds savings in both labor and certification. Furthermore, the vehicle components may be fabricated and can be inspected for defects prior to joining into an assembly, eliminating costly repairs due to part thinning or dislocation.

While the foregoing is directed to aspects of the present disclosure, other and further aspects of the present disclosure may be devised without departing from the basic scope thereof. Furthermore, while the foregoing is directed to polymers as applied to the aerospace industry, aspects of the present disclosure may be directed to other applications not associated with an aircraft, such as applications in the automotive, marine, energy industry, wind turbine, and the like.

What is claimed is:

1. A method of forming a polymer, the method comprising:
   A. forming a composition by introducing into a reactor:
      (1) aluminum chloride,
      (2) at least one of isophthaloyl chloride or terephthaloyl chloride,
      (3) an ether ketone ether represented by the structure:

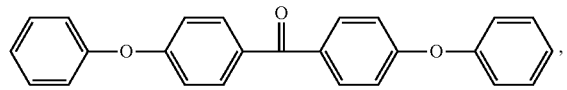

(4) an ether imide represented by the structure:

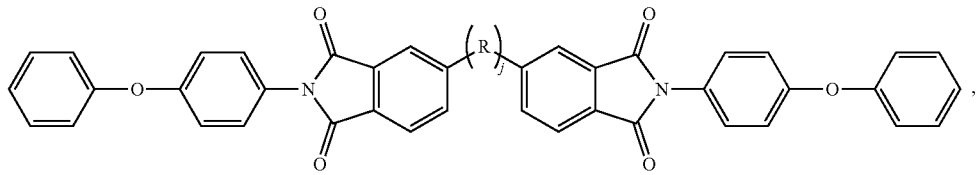

wherein each R is independently selected from the group consisting of

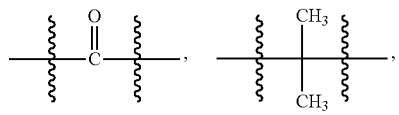

-continued
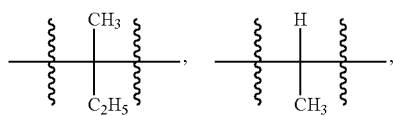
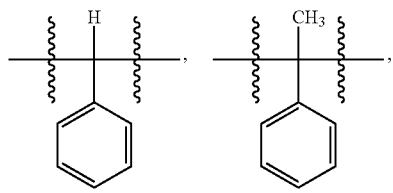
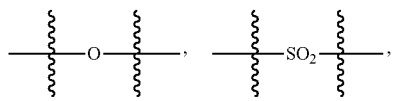
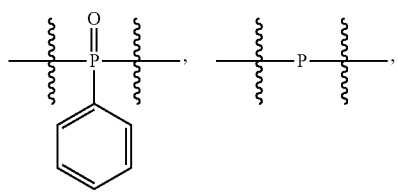
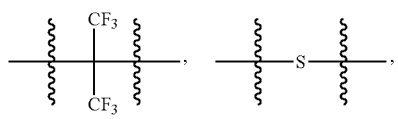
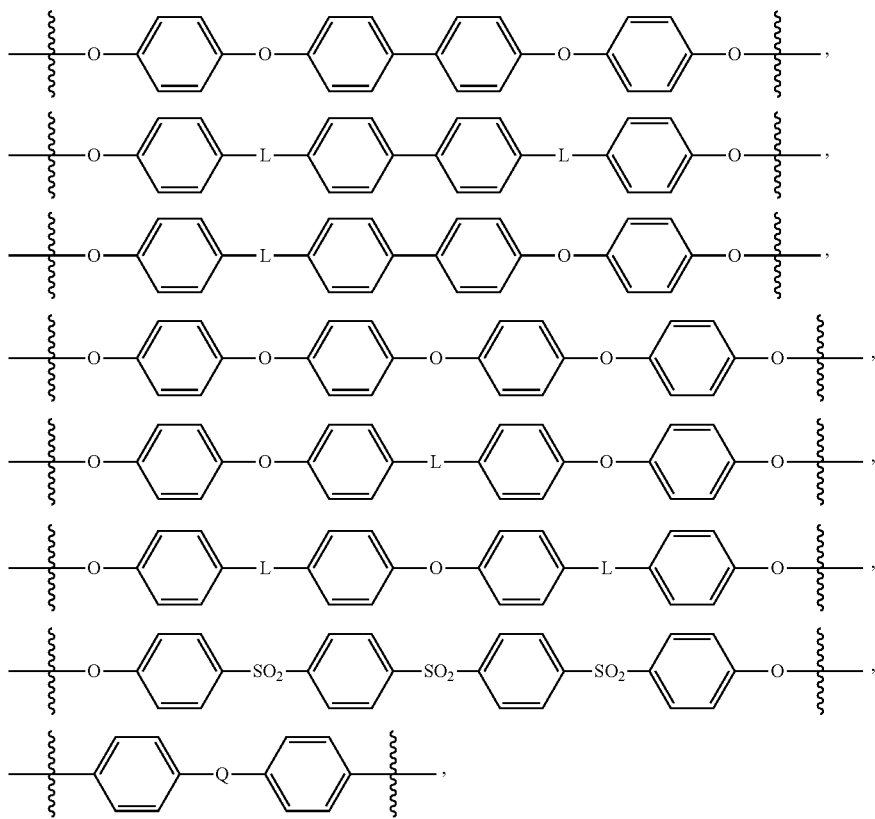

wherein each L is independently selected from the group consisting of —CH$_2$—, —(CH$_3$)$_2$C—, —O—, —S—, —SO$_2$— and —CO—, wherein each Q is independently selected from the group consisting of —S—, —SO$_2$—, —(CF$_3$)$_2$C—, —O—, and —(CH$_3$)$_2$C—, and wherein each j is a positive integer;

B. mixing the composition;
C. introducing a capping agent to the composition, wherein the capping agent is selected from the group consisting of

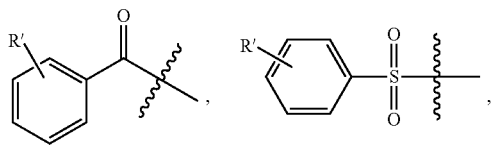

benzyl, and combination(s) thereof, wherein R' is selected from the group consisting of hydrogen, halo, C1-C20 alkyl, and cyano; and D. obtaining a polymer.

2. The method of claim 1, wherein introducing the aluminum chloride into the reactor comprises introducing the aluminum chloride into the reactor at a temperature of about −10° C., followed by allowing a temperature of the composition to increase to about 10° C., followed by cooling the composition to a temperature of about −10° C.

3. The method of claim 1, further comprising introducing a solvent into the reactor, wherein the composition comprises the solvent.

4. The method of claim 3, wherein the solvent is selected from the group consisting of o-dichlorobenzene, dichloromethane, dichloroethane, and mixture(s) thereof.

5. The method of claim 3, wherein introducing the solvent is performed by preheating the solvent before introducing the solvent into the reactor.

6. The method of claim 5, wherein preheating is performed at a temperature of from about 160° C. to about 190° C.

7. The method of claim 1, wherein mixing is performed at a temperature of from about −30° C. to about 25° C.

8. The method of claim 1, wherein obtaining the polymer comprises introducing water and ammonia to the composition.

9. The method of claim 1, wherein the polymer comprises:
(1) at least one of

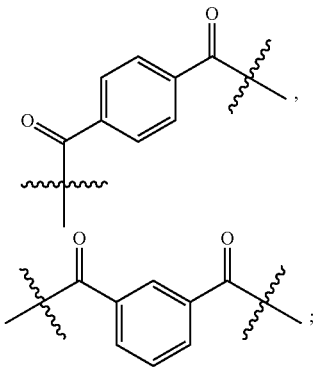

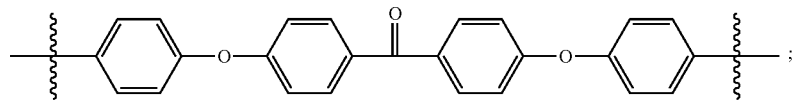 [SMILES: *c1ccc(Oc2ccc(C(=O)c3ccc(Oc4ccc(*)cc4)cc3)cc2)cc1]

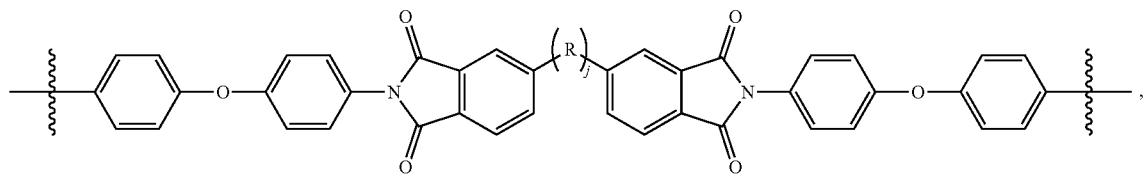

wherein each R of the polymer is independently selected from the group consisting of

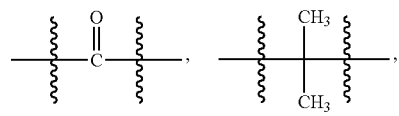

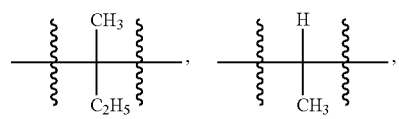

-continued
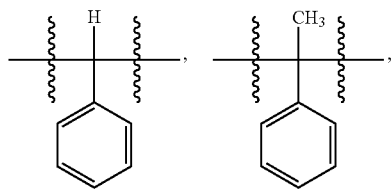
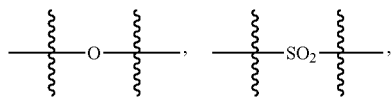
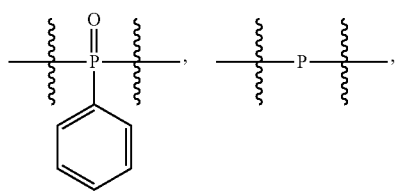
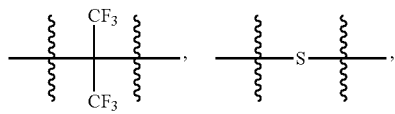
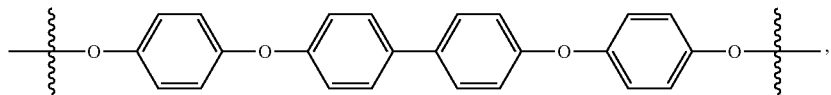
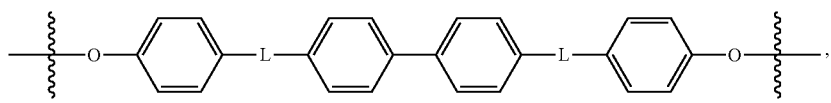
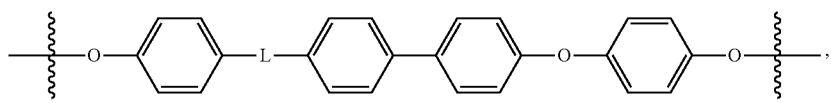
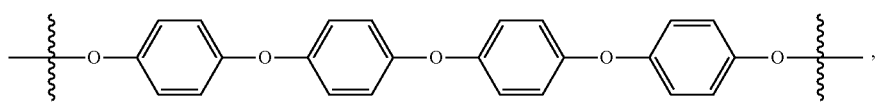
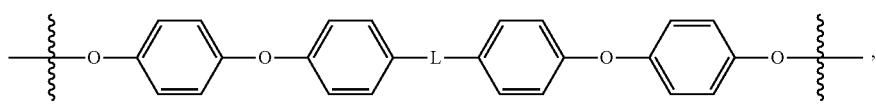
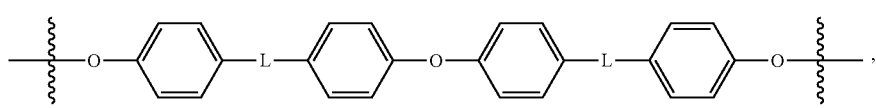
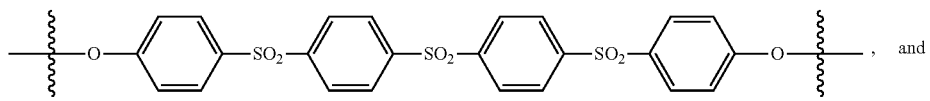, and
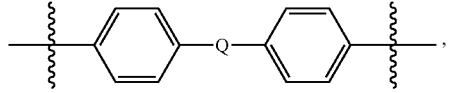

wherein each L of the polymer is independently selected from the group consisting of —CH$_2$—, —(CH$_3$)$_2$C—, —O—, —S—, —SO$_2$— and —CO—, wherein each Q of the polymer is independently selected from the group consisting of —S—, —SO$_2$—, —(CF$_3$)$_2$C—, —O—, and —(CH$_3$)$_2$C—, and wherein each j of the polymer is a positive integer; and (4) a capping agent selected from the group consisting of

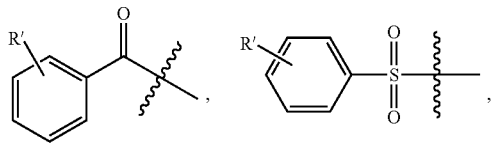

and benzyl, wherein R' of the polymer is selected from the group consisting of hydrogen, halo, C1-C20 alkyl, and cyano, wherein the molecular weight of the polymer is from about 50 kDa to about 150 kDa.

10. The method of claim 9, wherein the molecular weight of the polymer is from about 90 kDa to about 110 kDa.

11. The method of claim 9, wherein the polymer is a random copolymer.

12. The method of claim 9, wherein the polymer is a block copolymer.

13. A method for forming a bonded prepreg stack, the method comprising:
A. coating a thermoplastic prepreg with a polymer to form a coated thermoplastic prepreg, and
B. introducing the coated thermoplastic prepreg to an adherend, wherein the polymer comprises:
(1) at least one of

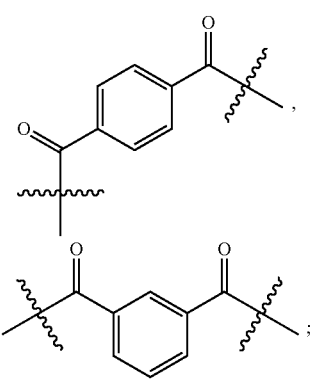

(2)

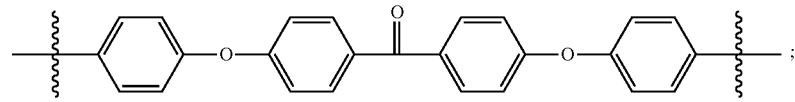

or
(3)

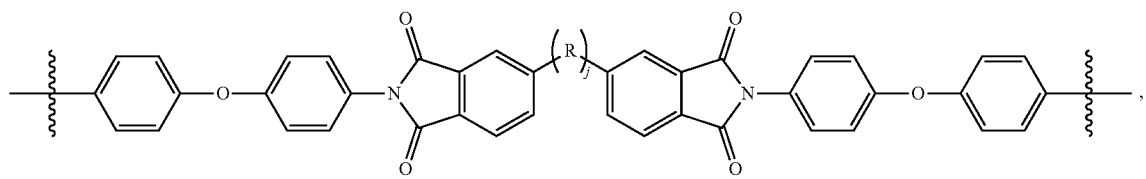

wherein each R is independently selected from the group consisting of

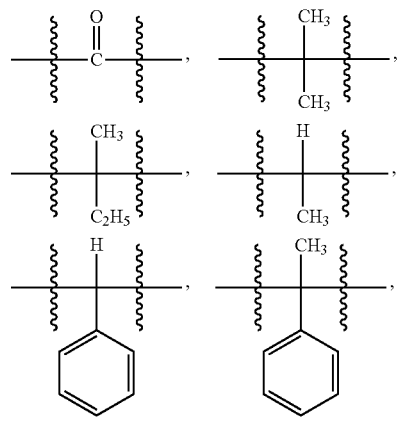

-continued
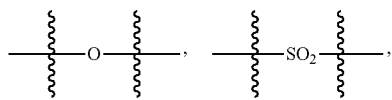
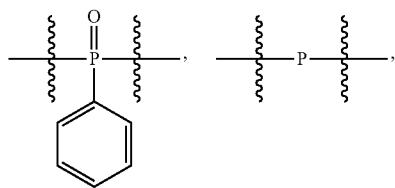
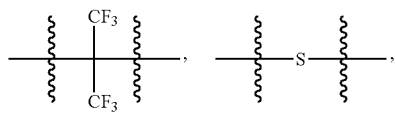
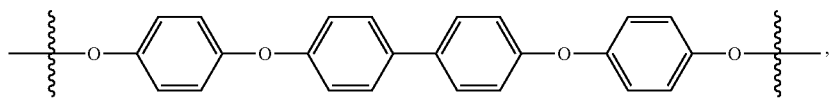
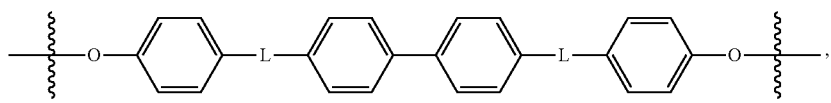
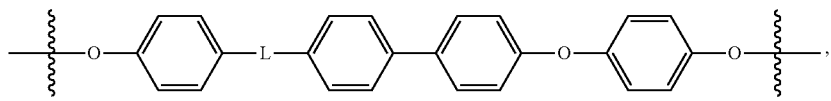
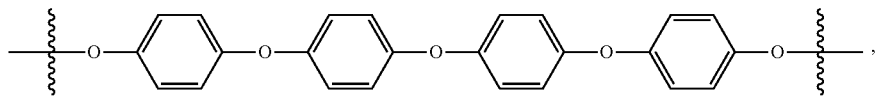
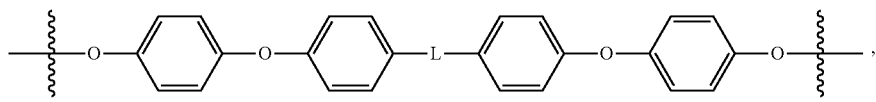
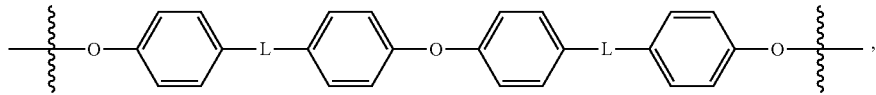
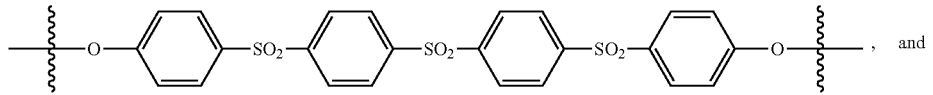, and
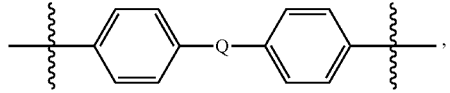, wherein each L is independently selected from the group consisting of —CH$_2$—, —(CH$_3$)$_2$C—, —O—, —S—, —SO$_2$— and —CO—, wherein each Q is independently selected from the group consisting of —S—, —SO$_2$—, —(CF$_3$)$_2$C—, —O—, and —(CH$_3$)$_2$C—, and wherein each j is a positive integer; and (4) a capping agent selected from the group consisting of

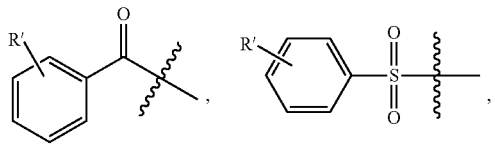

and benzyl, wherein R' is selected from the group consisting of hydrogen, halo, C1-C20 alkyl, and cyano, wherein the molecular weight of the polymer is from about 50 kDa to about 150 kDa.

14. The method of claim 13, wherein the molecular weight of the polymer is from about 90 kDa to about 110 kDa.

15. The method of claim 13, wherein the polymer is a random copolymer.

16. The method of claim 13, wherein the polymer is a block copolymer.

17. The method of claim 13, wherein the adherend is selected from the group consisting of a thermoset composite, a thermoplastic composite, a metal substrate, and combination(s) thereof.

18. The method of claim 13, further comprising heating the coated thermoplastic prepreg and adherend to form the bonded prepreg stack.

19. A method for forming a bonded prepreg stack, the method comprising:

coating an adherend with a polymer to form a coated adherend, and introducing the coated adherend to a thermoplastic prepreg, wherein the polymer comprises:

(1) at least one of

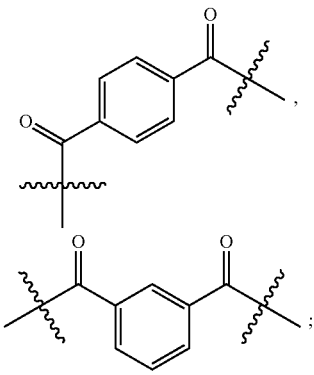

(2)

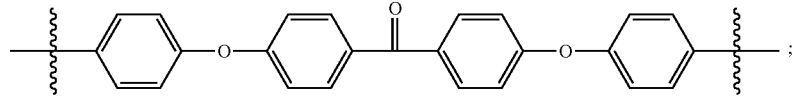 [SMILES: *c1ccc(Oc2ccc(C(=O)c3ccc(Oc4ccc(*)cc4)cc3)cc2)cc1]

or (3)

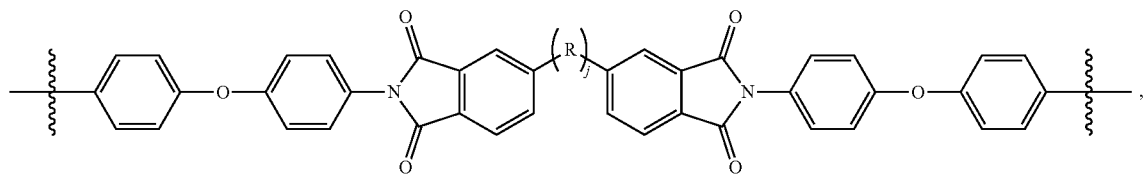

wherein each R is independently selected from the group consisting of

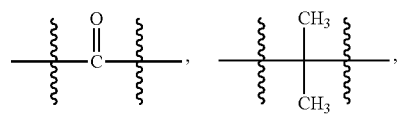

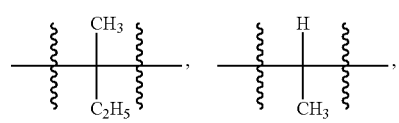

-continued
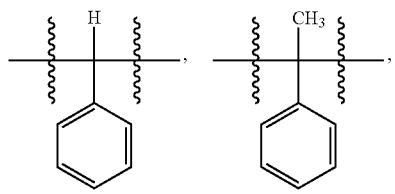
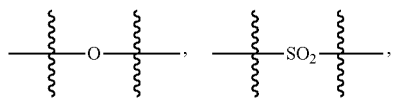
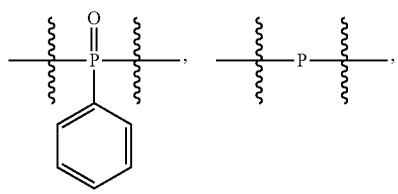
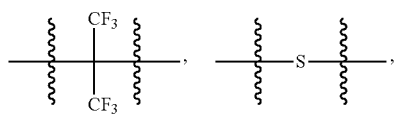
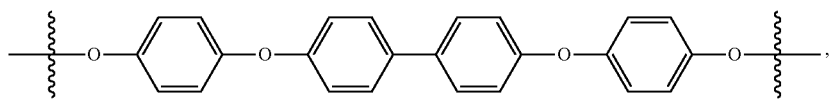
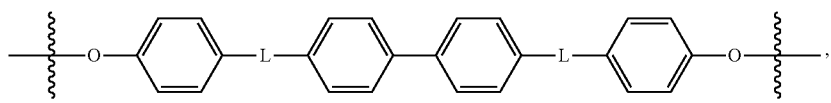
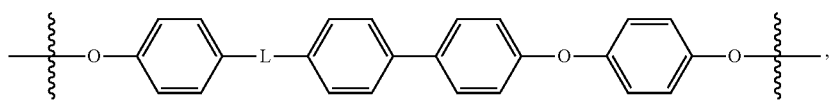
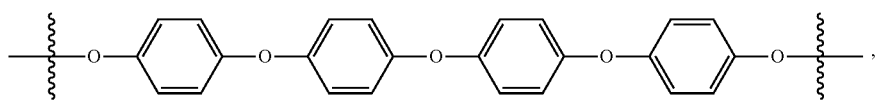
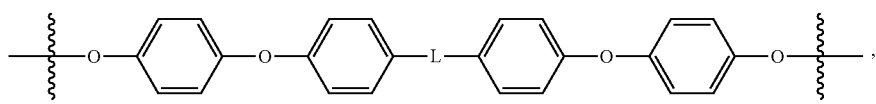
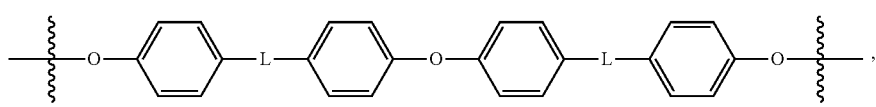
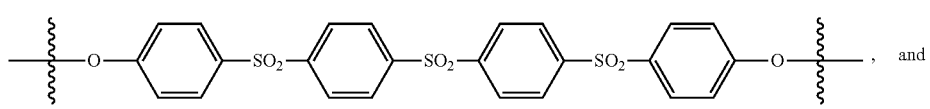, and
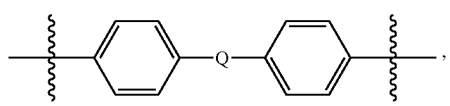, and wherein each L is independently selected from the group consisting of —CH$_2$—, —(CH$_3$)$_2$C—, —O—, —S—, —SO$_2$— and —CO—, wherein each Q is independently selected from the group consisting of —S—, —SO$_2$—, —(CF$_3$)$_2$C—, —O—, and —(CH$_3$)$_2$C—, and wherein each j is a positive integer; and (4) a capping agent selected from the group consisting of

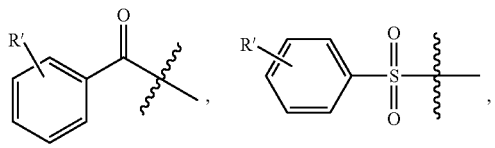

and benzyl, wherein R' is selected from the group consisting of hydrogen, halo, C1-C20 alkyl, and cyano, wherein the molecular weight of the polymer is from about 50 kDa to about 150 kDa.

20. The method of claim 19, wherein the molecular weight of the polymer is from about 90 kDa to about 110 kDa.

21. The method of claim 19, wherein the polymer is a random copolymer.

22. The method of claim 19, wherein the polymer is a block copolymer.

23. The method of claim 19, wherein the adherend is selected from the group consisting of a thermoset composite, a thermoplastic composite, a metal substrate, and combination(s) thereof.

24. The method of claim 19, further comprising heating the coated adherend and the thermoplastic prepreg to form the bonded prepreg stack.

25. The method of claim 19, wherein each R is independently selected from the group consisting of:

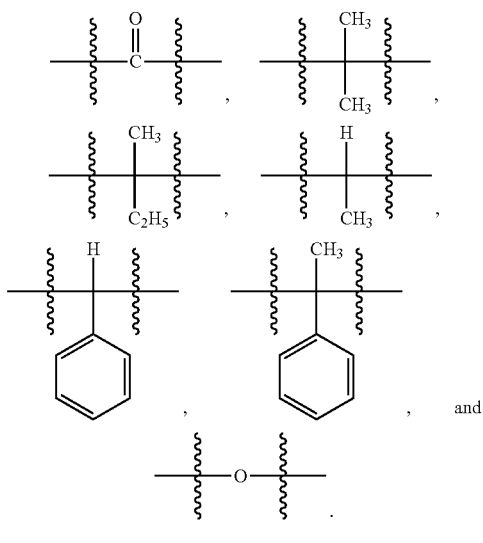

and

* * * * *

UNITED STATES PATENT AND TRADEMARK OFFICE
CERTIFICATE OF CORRECTION

PATENT NO. : 11,098,162 B2
APPLICATION NO. : 16/673584
DATED : August 24, 2021
INVENTOR(S) : Christopher H. Childers et al.

Page 1 of 2

It is certified that error appears in the above-identified patent and that said Letters Patent is hereby corrected as shown below:

On the Title Page

On the page 2, in item (57), in Column 1, in "Abstract", Lines 1-2, delete "

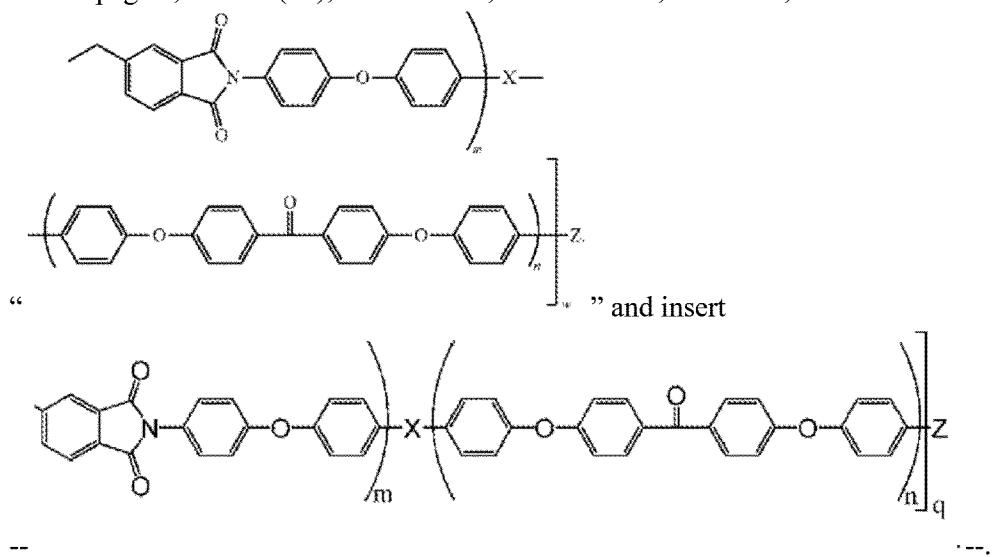

" and insert --

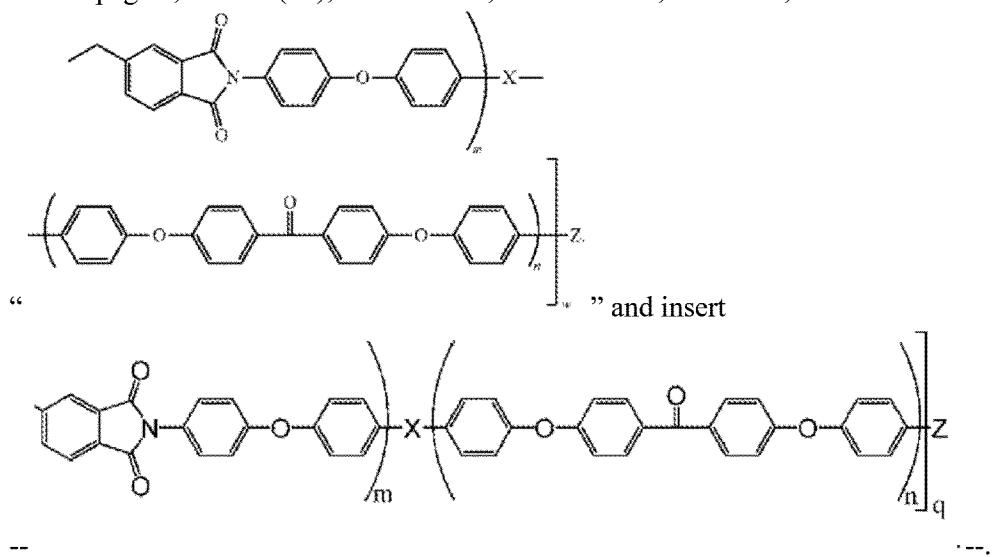

--.

In the Claims

In Column 56, Lines 45-46, in Claim 1, before "(4)" insert -- and --.

In Columns 59-60, Line 34, in Claim 9, delete "

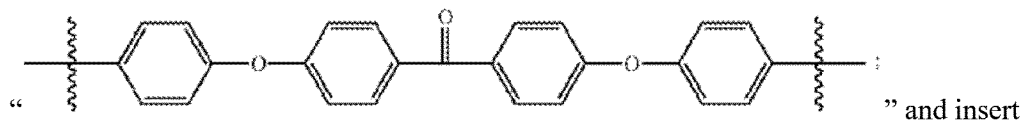

" and insert

Signed and Sealed this
Twenty-ninth Day of March, 2022

Drew Hirshfeld
*Performing the Functions and Duties of the
Under Secretary of Commerce for Intellectual Property and
Director of the United States Patent and Trademark Office*

CERTIFICATE OF CORRECTION (continued)
U.S. Pat. No. 11,098,162 B2

-- (2)  ; or --.